United States Patent
Wu et al.

(10) Patent No.: US 11,398,859 B2
(45) Date of Patent: Jul. 26, 2022

(54) CSI FEEDBACK METHOD, TERMINAL, AND BASE STATION

(71) Applicant: ZTE CORPORATION, Shenzhen (CN)

(72) Inventors: Hao Wu, Shenzhen (CN); Zhaohua Lu, Shenzhen (CN); Chuangxin Jiang, Shenzhen (CN); Xianghui Han, Shenzhen (CN); Shuqiang Xia, Shenzhen (CN); Bo Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/256,743

(22) PCT Filed: Jun. 25, 2019

(86) PCT No.: PCT/CN2019/092758
§ 371 (c)(1),
(2) Date: Dec. 29, 2020

(87) PCT Pub. No.: WO2020/001428
PCT Pub. Date: Jan. 2, 2020

(65) Prior Publication Data
US 2021/0111776 A1 Apr. 15, 2021

(30) Foreign Application Priority Data
Jun. 29, 2018 (CN) .......................... 201810711948.6

(51) Int. Cl.
H04W 72/04 (2009.01)
H04B 7/06 (2006.01)
(Continued)

(52) U.S. Cl.
CPC ......... *H04B 7/0626* (2013.01); *H04B 7/0413* (2013.01); *H04L 5/0048* (2013.01); *H04L 5/0053* (2013.01); *H04W 72/042* (2013.01)

(58) Field of Classification Search
CPC ............... H04W 24/10; H04W 72/042; H04W 72/0446; H04W 72/0453; H04W 72/1289;
(Continued)

(56) References Cited

U.S. PATENT DOCUMENTS

2015/0381255 A1  12/2015 Kuo
2018/0103387 A1*  4/2018 Cheng .................. H04W 76/27
(Continued)

FOREIGN PATENT DOCUMENTS

CN  103780358 A  5/2014
CN  104247494 A  12/2014
(Continued)

OTHER PUBLICATIONS

3GPP TSG RAN WG1 Meeting #93 R1-1805827 Busan, Korea, May 21-25, 2018 Source: ZTE Title: Remaining issues on CSI reporting Agenda Item: 7.1.2.2.2, Document for: Discussion and Decision pp. 1-5.
(Continued)

*Primary Examiner* — Eva Y Puente
(74) *Attorney, Agent, or Firm* — George McGuire

(57) ABSTRACT

Provided are a CSI feedback method and apparatus, a terminal, a base station, and a storage medium. The method includes: determining whether overwriting CSI processing units (CPUs) is required according to a triggered first type CSI report, and/or, according to signaling or a signaling format for triggering a first type CSI report; and in response to determining that overwriting the CPUs is required, over-
(Continued)

Determine whether overwriting CPUs is required according to a triggered first type CSI report, and/or, according to signaling or a signaling format for triggering a first type CSI report — S101

In response to determining that overwriting is required, overwrite W CPUs — S102 writing W CPUs, where W≤X, and X is the maximum number of CPUs used for processing CSI reports and supported by a terminal.

20 Claims, 2 Drawing Sheets

(51) Int. Cl.
*H04B 7/0413* (2017.01)
*H04L 5/00* (2006.01)

(58) Field of Classification Search
CPC ......... H04W 72/0406; H04W 72/0413; H04W 72/14; H04W 74/0833; H04W 4/40; H04W 72/04; H04W 72/12; H04L 5/0048; H04L 5/0053; H04L 5/0055; H04L 5/0094; H04L 1/1812; H04L 5/0051; H04L 1/1861; H04L 5/0023; H04L 27/26025; H04L 5/0057; H04L 5/0091; H04L 5/001; H04B 7/0626; H04B 7/0456; H04B 7/0617; H04B 7/0639; H04B 7/0695; H04B 7/0417; H04B 7/0632; H04B 7/024; H04B 7/063; H04B 7/088; H04B 17/318; H04B 17/336
USPC ........................................................ 375/267
See application file for complete search history.

(56) References Cited

U.S. PATENT DOCUMENTS

2018/0139639 A1   5/2018  Aiba et al.
2020/0007213 A1*  1/2020  Kakishima ............ H04L 5/0057

FOREIGN PATENT DOCUMENTS

| CN | 106301509 A | 1/2017 |
| CN | 107113045 A | 8/2017 |
| CN | 107733500 A | 2/2018 |
| CN | 108023617 A | 5/2018 |

OTHER PUBLICATIONS

International Search Report Form PCT/ISA/210, and Written Opinion Form PCT/ISA/237, International Application No. PCT/CN2019/092758, pp. 1-5 International Filing Date Jun. 25, 2019, search report dated Sep. 25, 2019.
Translated Chinese First Search Report.
Translated Chinese First Office Action. pp. 1-8.
3GPP TSG-RAN WG1 Meeting #93 R1-1806216 Ericsson "Corrections and clarifications for CSI Reporting" pp. 1-19.
3GPP TSG RAN WG1 #93 R1-1806506 Intel Corporation "Remaining issues on CSI reporting" pp. 1-12.
3GPP TSG RAN WG1 Meeting #87, R1-1612701, Reno, USA Nov. 14-18, 2016 "On Feedback Enhancements to Support Advanced CSI" NTT DOCOMO, Agenda Item 6.2.2.1.1, pp. 1-6.
European Search Report, dated Jun. 3, 2022. pp. 1-8.

* cited by examiner

CSI FEEDBACK METHOD, TERMINAL, AND BASE STATION

CROSS-REFERENCE TO RELATED APPLICATIONS

This is a National Stage Application, filed under 35 U.S.C. 371, of International Patent Application No. PCT/CN2019/092758, filed on Jun. 25, 2019, which claims priority to a Chinese Patent Application No. 201810711948.6 filed with the CNIPA on Jun. 29, 2018, the disclosures of which are incorporated herein by reference in their entireties.

TECHNICAL FIELD

The present application relates to the technical field of communications and, in particular, to a channel state information (CSI) feedback method, a terminal, and a base station.

BACKGROUND

In a multiple input multiple output (MIMO) wireless communication system, precoding or beamforming is performed on multiple transmit antennas, thereby achieving the purpose of improving transmission efficiency and reliability. To implement high-performance precoding or beamforming, a precoding matrix or a beamforming vector needs to be well matched with a channel, which requires that a transmit end may smoothly obtain channel state information (CSI).

In general, CSI feedback demands of a user equipment (UE) include simultaneous processing multiple CSI reports in a given period of time. In the wireless communication system, to describe the ability of a terminal performing CSI processing, the concept of CSI processing unit (CPU) is proposed. Each CPU corresponds to one CSI report, and the maximum number of CPUs that the terminal can support is the maximum number of CSI reports that the terminal can simultaneously process. Furthermore, CSI feedback would generate a certain delay. If CSI feedback timing has a relatively large delay, timeliness and accuracy for reporting CSI would become poor, thereby affecting the final performance of precoding or beamforming. Meanwhile, due to the complexity of the terminal, the terminal would have different abilities for processing the CSI, which also affects the CSI feedback timing of the UE to some extent.

Therefore, the number and the distribution manner of CPUs of the terminal are associated with the delay of the CSI feedback. The requirements of CSI delay for different services are also different. For example, some urgent services need fast CSI feedback with a relatively low delay to achieve high-reliability and low-delay communication transmission. How to perform operations on the CPUs owned by the terminal to satisfy the demands of different services for the CSI feedback timing has not been solved.

SUMMARY

To overcome the above defects, the present application provides a CSI feedback method and apparatus, a terminal, a base station, and a storage medium, to implement that operation is performed on the CPUs owned by the terminal to satisfy the demands of different services for CSI feedback timing.

A CSI feedback method in the present disclosure includes steps described below.

Whether overwriting CPUs is required is determined according to a triggered first type CSI report, and/or, according to signaling or a signaling format for triggering a first type CSI report.

When it is determined that overwriting is required, W CPUs are overwritten, where $W \leq X$, and X is the maximum number of CPUs used for processing CSI reports and supported by a terminal.

A CSI feedback method in the present disclosure includes steps described below.

When a terminal is triggered to feed back a first type CSI report, the terminal is enabled to determine whether overwriting W CPUs is required through the first type CSI report, and/or, through signaling or a signaling format for triggering the first type CSI report; where $W \leq X$, and X is the maximum number of CPUs used for processing CSI reports and supported by the terminal.

A CSI feedback apparatus in the present disclosure includes a determination module and an overwriting module.

The determination module is configured to determine whether overwriting CPUs is required according to a triggered first type CSI report, and/or, according to signaling or a signaling format for triggering a first type CSI report.

The overwriting module is configured to, in response to determining that overwriting is required, overwrite W CPUs, where $W \leq X$, and X is a maximum number of CPUs used for processing CSI reports and supported by a terminal.

A CSI feedback apparatus in the present disclosure includes a triggering unit.

The triggering unit is configured to, when a terminal is triggered to feed back a first type CSI report, enable the terminal to determine whether overwriting W CPUs is required through the first type CSI report, and/or, through signaling or a signaling format for triggering the first type CSI report; where $W \leq X$, and X is a maximum number of CPUs used for processing CSI reports and supported by the terminal.

A terminal in the present disclosure includes a memory and a processor. The memory is configured to store a CSI feedback computer program, and the processor executes the computer program to implement the steps of the first method described above.

A base station in the present disclosure includes a memory and a processor. The memory is configured to store a CSI feedback computer program, and the processor executes the computer program to implement the steps of the second method described above.

A computer readable storage medium in an embodiment of the present disclosure is configured to store a first CSI feedback computer program and/or a second CSI feedback computer program. The first CSI feedback computer program is capable of being executed by at least one processor to implement the steps of the first method described above, and the second CSI feedback computer program is capable of being executed by at least one processor to implement the steps of the second method described above.

The present application has the following beneficial effects.

The present application can perform operations on the CPUs, thereby effectively satisfying the demands of different services for CSI feedback timing.

The above description is only an overview of the schemes of the present application. To better understand the technical means of the present application, the present application may be implemented in accordance with the contents of the description. The above and other objects, features and advantages of the present application will be more apparent from embodiments of the present application described below.

BRIEF DESCRIPTION OF DRAWINGS

Various other advantages and benefits will become apparent to those skilled in the art upon reading the detailed description of the preferred embodiments hereinafter. The drawings are only for the purpose of illustrating the alternative embodiments and are not to be construed as limiting the present application. Furthermore, like reference numerals refer to like parts throughout the drawings. In the drawings.

DETAILED DESCRIPTION

Exemplary embodiments of the present disclosure will be described in detail with reference to the drawings. The drawings illustrate the exemplary embodiments of the present disclosure, but it should be understood that the present disclosure may be implemented in various ways and should not be limited to the embodiments set forth herein. On the contrary, these embodiments are provided for a thorough understanding of the present disclosure and to fully convey the scope of the present disclosure to those skilled in the art.

Terms such as "module", "component" or "unit" used to indicate elements in the subsequent description are merely used to facilitate the description of the present disclosure, and have no particular meaning in themselves. Therefore, "module", "component" or "unit" may be used in a mixed manner.

Terms such as "first" and "second" used to distinguish elements are merely used to facilitate the description of the present disclosure, and have no particular meaning in themselves.

EMBODIMENT ONE

Figure 1:
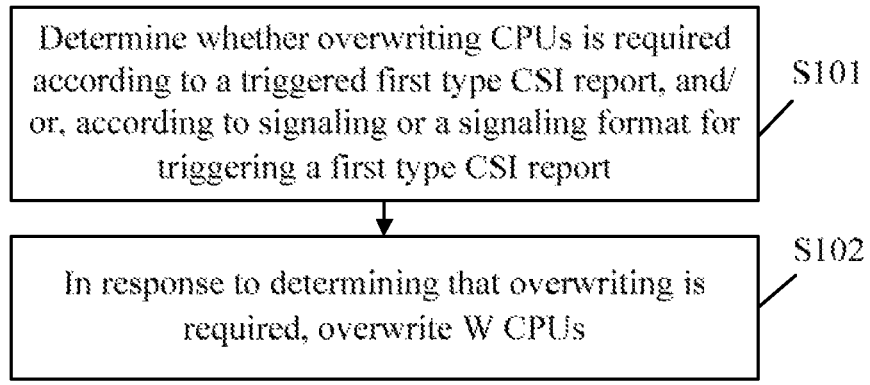
FIG. 1 is a flowchart of a CSI feedback method applied to a terminal side according to an embodiment of the present disclosure.

This embodiment of the present disclosure provides a CSI feedback method. As shown in FIG. 1, the method includes steps described below.

In S101, whether overwriting CPUs is required is determined according to a triggered first type CSI report, and/or, according to signaling or a signaling format for triggering a first type CSI report.

In S102, when it is determined that the overwriting is required, W CPUs are overwritten; where W≤X, and X is the maximum number of CPUs used for processing CSI reports and supported by a terminal.

In this embodiment of the present disclosure, the method is executed on a terminal side.

In this embodiment, for a terminal that may support X CPUs at most, when the overwriting is determined to be required according to the triggered first type CSI or the signaling for triggering the first type CSI, W CPUs are overwritten, that is, the first type CSI is enabled to overwrite W CPUs in the X CPUs, thereby CPUs effectively being performed to satisfy the demands of different services for the CSI feedback timing.

In some embodiments, a value of W may be determined in one or more of the following manners.

Manner 1: The value of W is determined to be X, that is, the terminal may use X CPUs for processing the triggered first type CSI. Manner 2: The value of W is determined to be a preset value, and the preset value may include at least one of: X/2 or 1. Manner 3: The value of W is determined according to higher layer configuration information of the first type CSI report, that is, the value of W is configured in the higher layer configuration information of a corresponding CSI report. Manner 4: The value of W is determined according to the first type CSI report. Manner 5: The value of W is determined according to a CSI reference signal (CSI-RS) resource associated with the first type CSI report, that is, the value of W is determined according to the corresponding CSI report or CSI-RS resources associated with the CSI report, for example, the value of W is a number of resources included in a CSI-RS resource set associated with the corresponding CSI report.

In some embodiments, Q overwritten CSI reports satisfy at least one of: after CPUs occupied by the Q overwritten CSI reports are overwritten, a sum of W and a number of CPUs unoccupied before the CPUs are overwritten is less than or equal to X; or, the Q overwritten CSI reports are Q CSI reports with low CSI reset priorities before the W CPUs are overwritten.

The CSI reset priority may be determined in one or more of the following manners.

Manner 1: The CSI reset priority is a CSI priority. Manner 2: The higher a CSI priority is, the higher a CSI reset priority corresponding to the CSI priority is. Manner 3: A CSI reset priority corresponding to CSI is determined according to whether the CSI is capable of being updated, that is, according to whether the CSI may be updated, the CSI reset priority of the CSI that is capable of being updated is high.

In some embodiments, whether overwriting CPUs is required may be determined in one or more of the following manners according to the triggered first type CSI report, and/or, according to the signaling or the signaling format for triggering the first type CSI report.

Manner 1: Whether overwriting the CPUs is required is determined according to a configuration parameter of the first type CSI report; where the configuration parameter may be a higher layer parameter indication, that is, in this manner, the terminal may be indicated according to the higher layer parameter whether to let this CSI overwrite the W CPUs.

Manner 2: Whether overwriting the CPUs is required is determined according to a radio network temporary identity (RNTI) used by downlink control information (DCI) for triggering the first type CSI report.

Manner 3: Whether overwriting the CPUs is required is determined according to a DCI parameter included in a DCI format for triggering the first type CSI report.

Manner 4: Whether overwriting the CPUs is required is determined according to a target block error rate of a modulation and coding scheme (MCS) or an MCS table used by the MCS indicated in DCI for scheduling the first type CSI report.

Manner 5: Whether overwriting the CPUs is required is determined according to a control channel resource used by the DCI for scheduling the first type CSI report.

Manner 6: Whether overwriting the CPUs is required is determined according to a search space used by the DCI for scheduling the first type CSI report, where the search space may include a time domain period and/or a time domain position of the search space.

Manner 7: Whether overwriting the CPUs is required is determined according to a target block error rate (BLER) of a channel quality indicator (CQI) or a CQI table corresponding to the first type CSI report.

Manner 8: Whether overwriting the CPUs is required is determined according to a service type corresponding to the first type CSI report.

Manner 9: Whether overwriting the CPUs is required is determined according to serving cell information corresponding to the first type CSI report.

Manner 10: Whether overwriting the CPUs is required is determined according to bandwidth part (BWP) information corresponding to the first type CSI report.

In some embodiments, the step in which that the W CPUs are overwritten includes performing at least one of not updating, not transmitting or discarding a second type CSI report; and/or determining whether to update the second type CSI report according to first time, second time and third time.

In some embodiments, the step of determining whether to update the second type CSI report according to the first time, the second time and the third time may also include steps described below, if the second time is greater than or equal to a sum of the first time and the third time or is greater than or equal to a sum of the first time, the third time and a predetermined constant, the second type CSI report is updated; otherwise, the second type CSI report is not updated, not transmitted or discarded.

The second type CSI report is a corresponding processed CSI report before the W CPUs are overwritten by the first type CSI report.

The first time is determined in at least one of the following manners: the first time is time from DCI for triggering the first type CSI report to a last symbol of a physical channel for reporting the first type CSI report; or the first time is time from a last symbol of a CSI interference measurement (CSI-IM) resource and/or a CSI-RS used for calculating the first type CSI report to the last symbol of the physical channel for reporting the first type CSI report.

The second time is determined in at least one of the following manners: the second time is time from DCI for triggering the second type CSI report to a physical channel for reporting the second type CSI report; the second time is time from a last symbol of a CSI-IM and/or a CSI-RS used for calculating the second type CSI report to the physical channel for reporting the second type CSI report; the second time is time from completion of reporting the above first type CSI to the physical channel for reporting the second type CSI report; or the second time is a smaller value selected from the time from the last symbol of the CSI-IM and/or the CSI-RS used for calculating the second type CSI report to the physical channel for reporting the second type CSI report and time from the completion of reporting the above first type CSI to a physical channel for scheduling reporting of the second type CSI report.

The third time is determined in at least one of the following manners: the third time is, in CSI reports triggered on a time slot in which the second type CSI report is triggered, a maximum value of multiple pieces of minimum time, required by the terminal, from DCI for triggering each of the CSI reports to a last symbol of a physical channel for reporting the each of the CSI reports; the third time is minimum time required by the terminal from the DCI for triggering the second type CSI report to a last symbol of the physical channel for reporting the second type CSI report; the third time is, in CSI reports triggered on the time slot in which the second type CSI report is triggered, a maximum value of multiple pieces of minimum time, required by the terminal, from a last symbol of a CSI-IM and/or a CSI-RS used for calculating each of the CSI reports to the last symbol of the physical channel for reporting the each of the CSI reports; or the third time is minimum time required by the terminal from the last symbol of the CSI-IM and/or the CSI-RS calculating the second type CSI report to a last symbol of the physical channel for reporting the second type CSI report.

For example, the first time, the second time and the third time may be determined in at least one of the following manners.

Manner 1: The first time is the time from the DCI for triggering the first type CSI report to a last symbol of the physical channel for reporting the first type CSI report; the second time is the time from the DCI for triggering the second type CSI report to the physical channel for reporting the second type CSI report; and the third time is, among CSI reports triggered on a time slot in which the second type CSI report is triggered, a maximum value in multiple minimum time differences required by the terminal from DCI for triggering each of the CSI reports (which may include the first type CSI report and the second type CSI report) to a last symbol of a physical channel reporting the each of the CSI reports, or the third time is a minimum time difference required by the terminal from the DCI for triggering the second type CSI report to a last symbol of the physical channel for reporting the second type CSI report.

For example, the above CSI that overwrites the CPUs is supposed to be first type CSI, and interrupted CSI in the CPUs is second type CSI. The time, used by the first type CSI, from DCI for triggering this CSI to a last symbol of a physical channel (e.g., a physical uplink shared channel (PUSCH) or a physical uplink control channel (PUCCH)) for reporting this CSI is YU (i.e., the first time); for a piece of second type CSI, the time of this CSI from DCI on which the CSI is triggered to a physical channel for reporting this CSI is Y (i.e., the second time); and within a time slot on which the second type CSI is triggered, in a case where no CPU interruption occurs, a maximum value of multiple minimum time differences required by the terminal from DCI for triggering each CSI of M CSI reports, which are capable of being updated, to a last symbol of a physical channel for reporting the each CSI is ZM (i.e., the third time). If Y is greater than or equal to ZM+YU, this second type CSI may be updated; otherwise, this second type CSI is not updated, or not transmitted. Alternatively, if Y is greater than or equal to ZM+YU+d, this second type CSI may be updated; otherwise, this second type CSI is not updated, or not transmitted, where d is a determined constant.

Manner 2: The first time is the time from a last symbol of a CSI-IM resource and/or a CSI-RS used for calculating the first type CSI report to the last symbol of the physical channel for reporting the first type CSI report; the second time is the time difference from a last symbol of a CSI-IM and/or a CSI-RS used for calculating the second type CSI report to the physical channel for reporting the second type CSI report; and the third time is, among CSI reports triggered on the time slot in which the second type CSI report is triggered, a maximum value in multiple minimum time differences, required by the terminal, from a last symbol of a CSI-IM and/or CSI-RS that calculates each of the CSI reports to a last symbol of a physical channel for reporting the each of the CSI reports, or the third time is a minimum time difference, required by the terminal, from the last symbol of the CSI-IM and/or the CSI-RS that calculates the second type CSI report to the last symbol of the physical channel for reporting the second type CSI report.

For example, the above CSI that overwrites the CPUs is supposed to be first type CSI, and interrupted CSI in the CPUs is second type CSI. The time used by the first type CSI from a last symbol used for calculating a CSI-RS and/or a CSI-IM of this CSI to a last symbol of a physical channel (e.g., a PUSCH or a PUCCH) for reporting this CSI is YU' (i.e., the first time); for a piece of second type CSI, the time difference from a last symbol of a CSI-RS and/or a CSI-IM that calculates this CSI to a physical channel for reporting this CSI is Y' (i.e., the second time); and within the time slot on which the second type CSI is triggered, in a case where no CPU interruption occurs, a maximum value of multiple minimum time differences, required by the terminal, from a last symbol of a CSI-RS and/or CSI-IM that calculates each CSI of M CSI reports, which are capable of being updated, to a last symbol of a physical channel for reporting the each CSI is ZM' (i.e., the third time). If Y' is greater than or equal to ZM'+YU', this second type CSI may be updated; otherwise, this second type CSI is not updated, or not transmitted. Alternatively, if Y' is greater than or equal to ZM'+YU'+d', this second type CSI may be updated; otherwise, this second type CSI is not updated, or not transmitted, where d' is a determined constant.

Manner 3: The first time is the time from the DCI for triggering the first type CSI report to the last symbol of the physical channel for reporting the first type CSI report; the second time is the time from the completion of reporting the above first type CSI to the physical channel for reporting the second type CSI report; and the third time is, among CSI reports triggered on a time slot in which the second type CSI report is triggered, a maximum value in multiple minimum time differences, required by the terminal, from the DCI for triggering each of the CSI reports to a last symbol of a physical channel for reporting the each of the CSI reports, or the third time is a minimum time difference required by the terminal from the DCI for triggering the second type CSI report to the last symbol of the physical channel for reporting the second type CSI report.

For example, the above CSI that overwrites the CPUs is supposed to be first type CSI, and interrupted CSI in the CPUs is second type CSI. The time used by the first type CSI from the DCI for triggering this CSI to a last symbol of a physical channel (e.g., a PUSCH or a PUCCH) for reporting this CSI is YU (i.e., the first time); for a piece of second type CSI, the time difference from completion of reporting the above first type CSI to a physical channel for reporting this CSI is Y (i.e., the second time); and at a moment when the CPUs are overwritten, in second type CSI originally existing in the CPUs, a maximum value of multiple minimum time differences, required by the terminal, from DCI for triggering each CSI of M CSI reports, which are capable of being updated, to a last symbol of a physical channel for reporting the each CSI is ZM (i.e., the third time). If Y is greater than or equal to ZM+YU, this second type CSI may be updated; otherwise, this second type CSI is not updated, or not transmitted. Alternatively, if Y is greater than or equal to ZM+YU+d, this second type CSI may be updated; otherwise, this second type CSI is not updated, or is not transmitted, where d is a determined constant.

Manner 4: The first time is the time from the last symbol of the CSI-IM and/or the CSI-RS used for calculating the first type CSI report to the last symbol of the physical channel reporting the first type CSI report; the second time is the time difference from the completion of reporting the above first type CSI to the physical channel for reporting the second type CSI report, or the second time is a smaller value selected from: the time difference from the last symbol of the CSI-IM and/or the CSI-RS used for calculating the second type CSI report to a physical channel for scheduling reporting of the second type CSI report and the time difference from the completion of reporting the above first type CSI to the physical channel for reporting the second type CSI report; and the third time is, among CSI reports triggered on the time slot in which the second type CSI report is triggered, a maximum value of multiple minimum time differences required by the terminal from a last symbol of a CSI-RS and/or CSI-IM used for calculating each of the CSI reports to a last symbol of a physical channel that reports the each of the CSI reports, or the third time is a minimum time difference required by the terminal from the last symbol of the CSI-RS and/or CSI-IM for calculating the second type CSI report to the last symbol of the physical channel for reporting the second type CSI report.

For example, the above CSI that overwrites the CPUs is supposed to be first type CSI, and interrupted CSI in the CPUs is second type CSI. The time used by the first type CSI from a last symbol of a CSI-RS and/or CSI-IM for calculating this CSI to a last symbol of a physical channel (e.g., a PUSCH or a PUCCH) for reporting this CSI is YU' (i.e., the first time); for a piece of second type CSI, the time difference from completion of reporting of the above first type CSI to a physical channel for reporting this CSI is Y' (i.e., the second time); and at a moment when the CPUs are overwritten, in second type CSI originally existing in the CPUs, a maximum value of multiple minimum time differences, required by the terminal, from a last symbol of a CSI-RS and/or CSI-IM used for calculating each CSI of M CSI reports, which are capable of being updated, to a last symbol of a physical channel for reporting the each CSI is ZM' (i.e., the third time). If Y' is greater than or equal to ZM'+YU', this second type CSI may be updated; otherwise, this second type CSI is not updated, or not transmitted. Alternatively, if Y' is greater than or equal to ZM'+YU'+d', this second type CSI may be updated; otherwise, this second type CSI is not updated, or not transmitted, where d' is a determined constant.

In some embodiments, the step in which the W CPUs are overwritten may also include one or more of the following manners, where a number of CSI-RS resources associated with the first type CSI report is UR, a number of CSI-RS ports associated with the first type CSI report is UP, a number of active CSI-RS resources existing before the W CPUs are overwritten is NR, a number of active CSI-RS ports existing before the W CPUs are overwritten is NP, a maximum number of active CSI-RS resources that the terminal is capable of supporting is AR, and the maximum number of active CSI-RS ports that the terminal is capable of supporting is AP.

Manner 1: A first active resource is cleared, and/or, a first active port is cleared, where the first active resource is an active CSI-RS resource associated with corresponding processed CSI before the W CPUs are overwritten, and the first active port is an active CSI-RS port associated with the corresponding processed CSI before the W CPUs are overwritten.

Manner 2: A number of current active CSI-RS resources is reset to UR, and/or, a number of current active CSI-RS ports is reset to UP, and CSI associated with NR active CSI-RSs and/or NP active CSI-RS ports existing before the W CPUs are overwritten is not updated, not transmitted or discarded.

Manner 3: Active CSI-RS resources and/or ports associated with B second type CSI reports are cleared in an order of CSI-RS reset priorities associated with CSI-RSs from low to high, where B is a minimum value satisfying at least one of the following conditions.

After the active CSI-RS resources associated with the B second type CSI reports are cleared, a sum of UR and a number of remaining active CSI-RS resources is less than or equal to AR.

After the active CSI-RS ports associated with the B second type CSI reports are cleared, a sum of UP and a number of remaining active CSI-RS ports is less than or equal to AP.

Manner 4: The B second type CSI reports are not updated, not transmitted or discarded.

A CSI-RS reset priority may be determined in one or more of the following manners. Manner 1: The CSI-RS reset priority is a CSI priority associated with a CSI-RS. Manner 2: The higher a CSI priority associated with a CSI-RS is, the higher a CSI-RS reset priority corresponding to the CSI-RS is. Manner 3: A CSI-RS reset priority is determined according to whether CSI associated with a CSI-RS may be updated.

It is to be noted that a kind of CSI overwriting the W CPUs also means that this kind of CSI preempts the W CPUs, or that CSI originally existing in the W CPUs are cleared, or that CSI originally existing in the W CPUs are interrupted.

EMBODIMENT TWO

In this embodiment, for one terminal that may support X CPUs at most, when this terminal is provided with a CSI report to perform periodic or semi-persistent feedback, and at least one of the following conditions is satisfied, the terminal performs fast periodic or semi-persistent CSI feedback.

Condition 1, a base station only configures this one CSI report.

Condition 2, this report occupies all X CPUs between a last symbol of a channel (e.g., a PUCCH or a PUSCH) for transmitting the CSI report every time to a corresponding CSI reference resource.

Condition 3, this report occupies all X CPUs between the last symbol of the channel (e.g., a PUCCH or a PUSCH) for transmitting the CSI report every time to a latest CSI-RS and/or CSI-IM before the corresponding CSI reference resource.

In addition, the fast periodic or semi-persistent CSI feedback refers to that a number Z of symbols between the last symbol of the channel for transmitting the CSI report to the corresponding CSI reference resource and a number Z' of symbols between the last symbol of the channel for transmitting the CSI report to the latest CSI-RS and/or CSI-IM before the corresponding CSI reference resource satisfy at least one of the following two tables, where an SCS is a sub-carrier space.

TABLE 1

| SCS | Z | Z' |
|---|---|---|
| 15 kHz | 10 | 8 |
| 30 kHz | 13 | 11 |
| 60 kHz | 25 | 21 |
| 120 kHz | 43 | 36 |

TABLE 2

| SCS | Z | Z' |
|---|---|---|
| 15 kHz | 9 | 7 |
| 30 kHz | 13 | 11 |
| 60 kHz | 25 | 21 |
| 120 kHz | 43 | 36 |

This embodiment of the present disclosure provides a CSI feedback method. The method includes steps described below.

Whether overwriting CPUs is required is determined according to a triggered first type CSI report, and/or, according to signaling or a signaling format for triggering a first type CSI report; and in response to determining that overwriting is required, X CPUs are overwritten. X is a maximum number of CPUs used for processing CSI reports and supported by a terminal. That is, for a terminal that may support X CPUs at most, when the triggered CSI of this terminal or the signaling for triggering this CSI satisfies the first condition, this CSI preempts these X CPUs, or the X CPUs are overwritten by this CSI, or the X CPUs are cleared, or CSI originally existing in the X CPUs is interrupted.

In this embodiment, for some particular types of CSI, the terminal reports to the base station a required minimum value Z of a time interval from DCI for triggering such CSI to a last symbol of a physical channel for reporting such CSI, and a required minimum value Z' of a time interval from a last symbol of an associated CSI-RS/CSI-IM to the last symbol of the physical channel for reporting such CSI.

Figure 2:
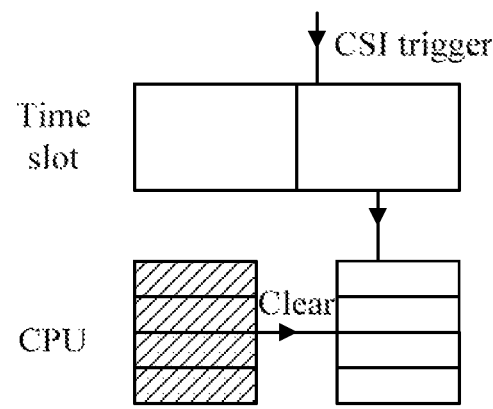
FIG. 2 is a schematic diagram illustrating an effect of CPUs being preempted by CSI according to an embodiment of the present disclosure.

As shown in FIG. 2, there is an example. In a time slot, if CSI that satisfies the first condition is triggered or the CSI is triggered by signaling satisfying a first condition, these X CPUs are overwritten by this CSI, that is, whether overwriting CPUs is required is determined according to the triggered first type CSI report or the signaling for triggering the first type CSI report; and in response to determining that overwriting is required, X CPUs are overwritten. For example, the terminal clears these X CPUs, that is, the terminal interrupts the CSI that is being calculated in these X CPUs, and allocates these X CPUs to the first type CSI for processing the CSI, that is, the CSI preempts these X CPUs. After the CSI overwrites these X CPUs, the terminal determines whether a scheduling time offset of the base station satisfies the demand of the terminal for CSI processing time according to the minimum values of Z and Z' that the terminal may support, or the terminal determines whether the scheduling time offset of the base station satisfies the demand of the terminal for the CSI processing time according to the values of Z and Z' of the terminal in above Table 1 or Table 2.

The above first condition at least includes one of:

1. Whether overwriting the CPUs is required is determined according to a configuration parameter of the first type CSI report; that is, in a configuration parameter set of this CSI report, the terminal may be indicated according to a higher layer parameter whether to let this CSI overwrite the W CPUs. For example, a parameter CPU-Pre-emption is configured, when the parameter is configured as ON, these X CPUs are preempted when this CSI is triggered. If the parameter is not configured or the parameter is configured as OFF, the CPUs are not overwritten or preempted.

2. Whether overwriting the CPUs is required is determined according to a radio network temporary identity used by the DCI for triggering the first type CSI report; that is, whether overwriting the CPUs is required may be determined according to the RNTI used by the DCI for triggering this CSI. If the DCI for triggering the CSI is scrambled by a designated RNTI, these X CPUs are preempted when this CSI is triggered. If the DCI is scrambled by other RNTIs, the CPUs are not overwritten or preempted.

3. Whether overwriting the CPUs is required is determined according to a DCI parameter included in a DCI format for triggering the first type CSI report; that is, whether to perform preemption of these X CUPs may be indicated according to an explicit DCI domain used in the DCI for triggering this CSI. For example, if this DCI domain indicates 1, these X CPUs are preempted when this CSI is triggered. If this DCI domain indicates 0, the CPUs are not overwritten or preempted.

4. Whether overwriting the CPUs is required is determined according to or a target block error rate of a modulation and coding scheme (MCS) or an MCS table used by the MCS indicated in the DCI for scheduling the first type CSI report; that is, whether overwriting the CPUs is required may be determined according to the target BLER of the MCS table or the MCS table used by the MCS indicated in the DCI for scheduling this CSI. If this MCS table is an MCS table with a target BLER less than 10e-1, these X CPUs are preempted when this CSI is triggered; otherwise, the CPUs are not overwritten or preempted.

5. Whether overwriting the CPUs is required is determined according to a control channel resource used by the DCI for scheduling the first type CSI report; that is, whether overwriting the CPUs is required may be determined according to the control channel resource used by the DCI for scheduling this CSI. For example, if a period is less than 14 orthogonal frequency division multiplexing (OFDM) symbols, or a time domain OFDM symbol offset is not an integer multiple of 14, or a time domain position is not within first three time domain symbols of the time slot, these X CPUs are preempted when this CSI is triggered; otherwise, the CPUs are not overwritten or preempted.

6. Whether overwriting the CPUs is required is determined according to a search space used by the DCI for scheduling the first type CSI report; that is, whether overwriting the CPUs is required may be determined according to the search space (including a time domain period and/or a time domain position of the search space) used by the DCI for scheduling this CSI. For example, if a period is less than 14 OFDM symbols, or a time domain OFDM symbol offset is not an integer multiple of 14, or a time domain position is not within first three time domain symbols of the time slot, these X CPUs are preempted when this CSI is triggered; otherwise, the CPUs are not overwritten or preempted.

7. Whether overwriting the CPUs is required is determined according to a target block error rate of a CQI or a CQI table corresponding to the first type CSI report; that is, whether overwriting the CPUs is required may be determined according to the target BLER of the CQI table or the CQI table corresponding to this CSI. For example, if the target BLER of the CQI table used by this CSI is less than 10e-1, these X CPUs are preempted when this CSI is triggered; otherwise, the CPUs are not overwritten or preempted.

8. Whether overwriting the CPUs is required is determined according to a service type corresponding to the first type CSI report.

9. Whether overwriting the CPUs is required is determined according to serving cell information corresponding to the first type CSI report.

10. Whether overwriting the CPUs is required is determined according to bandwidth part (BWP) information corresponding to the first type CSI report.

In some embodiments, other CSI originally existing in the CPUs but is overwritten or interrupted by the above CSI may be processed in at least one of the following manners.

Manner 1: The terminal does not update the interrupted CSI, or the terminal does not transmit the interrupted CSI, or the terminal discards the interrupted CSI.

Figure 3:
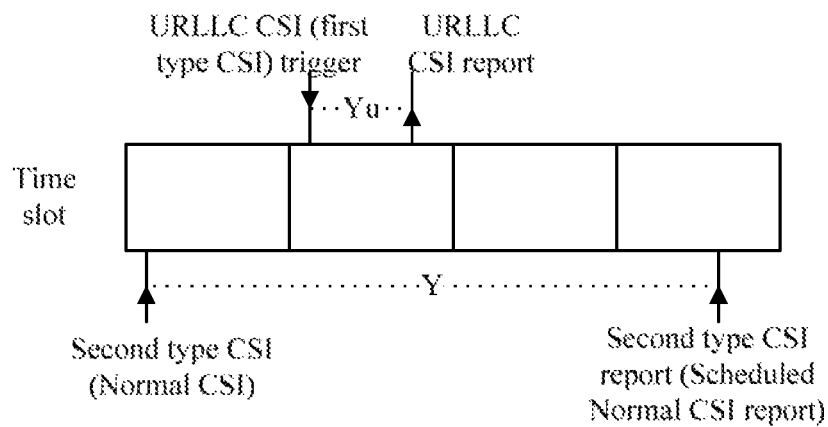
FIG. 3 is a schematic diagram illustrating a scheduling time offset of a first type CSI and a second type CSI according to an embodiment of the present disclosure.

Manner 2: The above CSI that overwrites the CPUs is supposed to be first type CSI, and the interrupted CSI in the CPUs is second type CSI. The time used by the first type CSI from DCI for triggering this CSI to a last symbol of a physical channel (e.g., a PUSCH or a PUCCH) for reporting this CSI is YU (i.e., first time); for a piece of second type CSI, the time of this CSI from DCI on which the CSI is triggered to a physical channel for reporting this CSI is Y (i.e., second time); and (as shown in FIG. 3) within a time slot on which the second type CSI is triggered, in a case where no CPU interruption occurs, a maximum value of multiple minimum time differences, required by the terminal, from DCI for triggering each CSI of M CSI reports, which are capable of being updated, to a last symbol of a physical channel for reporting the each CSI is ZM (i.e., third time). If Y is greater than or equal to ZM+YU, this second type CSI may be updated; otherwise, this second type CSI is not updated, or not transmitted. Alternatively, if Y is greater than or equal to ZM+YU+d, this second type CSI may be updated; otherwise, this second type CSI is not updated, or not transmitted, where d is a determined constant.

Manner 3: The above CSI that overwrites the CPUs is supposed to be first type CSI, and the interrupted CSI in the CPUs is second type CSI. The time used by the first type CSI from a last symbol of a CSI-IM and/or a CSI-RS used for calculating this CSI to a last symbol of a physical channel (e.g., a PUSCH or a PUCCH) for reporting this CSI is YU' (i.e., first time); for a piece of second type CSI, the time difference from a last symbol of a CSI-RS and/or CSI-IM used for calculating this CSI to a physical channel for reporting this CSI is Y' (i.e., second time); and within a time slot on which the second type CSI is triggered, in a case where no CPU interruption occurs, a maximum value of multiple minimum time differences, required by the terminal, from a last symbol of a CSI-RS and/or CSI-IM used for calculating each CSI of M CSI reports, which are capable of being updated, to a last symbol of a physical channel for reporting the each CSI is ZM' (i.e., third time). If Y' is greater than or equal to ZM'+YU', this second type CSI may be updated; otherwise, this second type CSI is not updated, or is not transmitted. Alternatively, if Y' is greater than or equal to ZM'+YU'+d', this second type CSI may be updated; otherwise, this second type CSI is not updated, or is not transmitted, where d' is a determined constant.

Manner 4: The above CSI that overwrites the CPUs is supposed to be first type CSI, and the interrupted CSI in the CPUs is second type CSI. The time used by the first type CSI from DCI for triggering this CSI to a last symbol of a physical channel (e.g., a PUSCH or a PUCCH) for reporting this CSI is YU (i.e., first time); for a piece of second type CSI, the time difference from completion of reporting the above first type CSI to a physical channel for reporting this CSI is Y (i.e., second time); and at a moment when the CPUs are overwritten, in second type CSI originally existing in the CPUs, a maximum value of multiple minimum time differences, required by the terminal, from DCI for triggering each CSI of M CSI reports, which are capable of being updated, to a last symbol of a physical channel for reporting the each CSI is ZM (i.e., third time). If Y is greater than or equal to ZM+YU, this second type CSI may be updated; otherwise, this second type CSI is not updated, or not transmitted. Alternatively, if Y is greater than or equal to ZM+YU+d, this second type CSI may be updated; otherwise, this second type CSI is not updated, or not transmitted, where d is a determined constant.

Manner 5: The above CSI that overwrites the CPUs is supposed to be first type CSI, and the interrupted CSI in the CPUs is second type CSI. The time used by the first type CSI from a last symbol of a CSI-RS and/or a CSI-IM used for calculating this CSI to a last symbol of a physical channel (e.g., a PUSCH or a PUCCH) for reporting this CSI is YU' (i.e., first time); for a piece of second type CSI, the time difference from completion of reporting the above first type CSI to a physical channel for reporting this CSI is Y' (i.e., second time); and at a moment when the CPUs are overwritten, in second type CSI originally existing in the CPU, a maximum value of multiple minimum time differences, required by the terminal, from a last symbol of a CSI-RS and/or a CSI-IM used for calculating each CSI of M CSI reports, which are capable of being updated, to a last symbol of a physical channel for reporting each CSI is ZM' (i.e., third time). If Y' is greater than or equal to ZM'+YU', this second type CSI may be updated; otherwise, this second type CSI is not updated, or not transmitted. Alternatively, if Y' is greater than or equal to ZM'+YU'+d', this second type CSI may be updated; otherwise, this second type CSI is not updated, or not transmitted, where d' is a determined constant.

In some embodiments, a CSI-RS resource defined in the following manners is an active CSI-RS resource.

For an aperiodic CSI-RS, the CSI-RS is an active CSI-RS resource from the triggered DCI to a last symbol of a physical channel for transmitting a CSI report corresponding to the CSI-RS.

For a semi-persistent CSI-RS, the CSI-RS is an active CSI-RS resource when activation signaling is applicable until deactivation signaling is applicable.

For a periodic CSI-RS, the CSI-RS is an active CSI-RS resource before the configuration of the CSI-RS is released.

In addition, the number of active CSI-RS ports is a total number of ports on active CSI-RS resources.

In some embodiments, the above CSI that overwrites the CPUs is supposed to be first type CSI, and the interrupted CSI in the CPUs is second type CSI. The step in which the W CPUs are overwritten may also include one or more of the following manners, where a number of CSI-RS resources associated with the first type CSI report is UR, a number of CSI-RS ports associated with the first type CSI report is UP, a number of active CSI-RS resources existing before the W CPUs are overwritten is NR, a number of active CSI-RS ports existing before the W CPUs are overwritten is NP, a maximum number of active CSI-RS resources supported by the terminal is AR, and a maximum number of active CSI-RS ports supported by the terminal is AP.

A first active resource is cleared, and/or, a first active port is cleared; where the first active resource is an active CSI-RS resource associated with corresponding processed CSI before the W CPUs are overwritten, and the first active port is an active CSI-RS port associated with the corresponding processed CSI before the W CPUs are overwritten.

A number of current active CSI-RS resources is reset to UR, and/or, a number of current active CSI-RS ports is reset to UP, and CSI, which is associated with NR active CSI-RSs and/or NP active CSI-RS ports existing before the W CPUs are overwritten, is not updated, not transmitted or discarded.

Active CSI-RS resources and/or ports associated with B second type CSI reports are cleared in an order of CSI-RS reset priorities associated with CSI-RSs from low to high, where B is a minimum value satisfying at least one of the following conditions:

after the active CSI-RS resources associated with the B second type CSI reports are cleared, a sum of UR and a number of remaining active CSI-RS resources is less than or equal to AR; or after the active CSI-RS ports associated with the B second type CSI reports are cleared, a sum of UP and a number of remaining active CSI-RS ports is less than or equal to AP.

The B second type CSI reports are not updated, not transmitted or discarded.

The CSI-RS reset priority includes at least one of the following: a CSI priority associated with a CSI-RS, the higher a CSI priority of the CSI-RS is, the higher the CSI-RS reset priority is; or the CSI-RS reset priority is determined according to whether CSI associated with a CSI-RS may be updated, the CSI-RS reset priority of CSI that may be updated is higher.

EMBODIMENT THREE

This embodiment of the present disclosure provides a channel state information (CSI) feedback method. The method includes steps described below, whether overwriting CPUs is required is determined according to a triggered first type CSI report, and/or, according to signaling or a signaling format for triggering a first type CSI report; and when it is determined that overwriting is required, W CPUs are overwritten. X is a maximum number of CPUs used for processing CSI reports and supported by a terminal. That is, for one terminal that may support X CPUs at most, when the triggered CSI of this terminal or the signaling for triggering this CSI satisfies a first condition, this CSI preempts the W CPUs, or the W CPUs are overwritten by this CSI, or the W CPUs are cleared, or CSI originally existing in the W CPUs are interrupted.

In this embodiment, for a particular type of CSI, the terminal reports to the base station a required minimum value Z of a time interval from DCI for triggering such CSI to a last symbol of a physical channel for reporting such CSI, and a required minimum value Z' of a time interval from a last symbol of an associated CSI-RS/CSI-IM to the last symbol of the physical channel for reporting such CSI.

Figure 4:
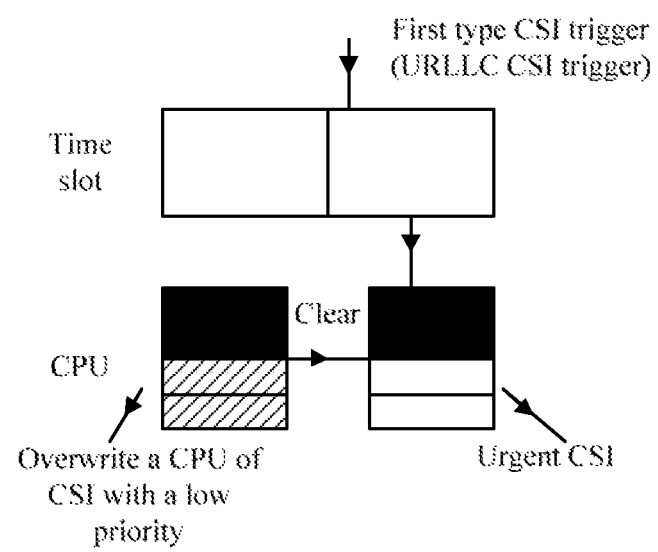
FIG. 4 is a schematic diagram illustrating an effect of part of CPUs being preempted by a kind of CSI according to an embodiment of the present disclosure.

There is an example shown in FIG. 4. On a time slot (Time), if CSI satisfying the first condition is triggered or CSI is triggered by signaling satisfying the first condition, W CPUs of the X CPUs are overwritten by this CSI. The terminal clears the W CPUs, that is, the terminal interrupts CSI which is being calculated in these W CPUs, and allocates the W CPUs to the CSI satisfying the first condition for processing the CSI, that is, the CSI preempts the W CPUs.

After the CSI overwrites the W CPUs, the terminal determines whether a scheduling time offset of the base station satisfies the demand of the terminal for CSI processing time according to the minimum values of Z and Z' that the terminal may support, or the terminal determines whether the scheduling time offset of the base station satisfies the demand of the terminal for the CSI processing time according to the values of Z and Z' of the terminal in above Table 1 or Table 2. W is an integer less than or equal to X, and may be determined in at least one of the following manners.

W has a fixed value, such as X/2 or 1.

The value of W is configured in higher layer configuration information of the corresponding CSI report.

The value of W is determined according to the corresponding CSI.

The value of W is determined according to CSI-RS resources associated with the corresponding CSI report, for example, the value of W is a number of resources included in a CSI-RS resource set associated with the corresponding CSI report.

The above cleared CSI reports are Q CSI reports with low CSI reset priorities of CSI included before the CPUs are overwritten, and Q is a minimum value satisfying the following condition: after CPUs occupied by the Q CSI reports are cleared, a number of remaining unoccupied CPUs before the CPUs are overwritten plus W is less than or equal to X.

The CSI reset priority includes at least one of: a CSI priority, the higher a CSI priority of CSI is, the higher the CSI reset priority of the CSI is; or according to whether CSI may be updated, the CSI reset priority of CSI that may be updated is higher.

The above first condition at least includes one of:

1. Whether overwriting the CPUs is required is determined according to a configuration parameter of the first type CSI report; that is, in a higher layer configuration parameter set of this CSI report, the terminal may be indicated according to a higher layer parameter whether to let this CSI overwrite W CPUs. For example, if a parameter CPU-Pre-emption is configured, when the parameter is configured as ON, the W CPUs are preempted when this CSI is triggered. If the parameter is not configured or the parameter is configured as OFF, the CPUs are not overwritten or preempted.

2. Whether overwriting the CPUs is required is determined according to an RNTI used by the DCI for triggering the first type CSI report; that is, whether overwriting the CPUs is required may be determined according to the RNTI used by the DCI for triggering this CSI. If the DCI for triggering the CSI is scrambled by a designated RNTI, the W CPUs are preempted when this CSI is triggered. If the DCI is scrambled by other RNTIs, the CPUs are not overwritten or preempted.

3. Whether overwriting the CPUs is required is determined according to a DCI parameter included in a DCI format for triggering the first type CSI report; that is, whether to perform preemption of the W CUPs may be indicated according to an explicit DCI domain used in the DCI for triggering this CSI. For example, if this DCI domain indicates 1, the W CPUs are preempted when this CSI is triggered. If this DCI domain indicates 0, the CPUs are not overwritten or preempted.

4. Whether overwriting the CPUs is required is determined according to a target block error rate of an MCS or an MCS table used by the MCS indicated in the DCI for scheduling the first type CSI report; that is, whether overwriting the CPUs is required may be determined according to the MCS table used by the MCS indicated in the DCI for scheduling this CSI. If this MCS table is an MCS table having a target BLER less than 10e-1, the W CPUs are preempted when this CSI is triggered; otherwise, the CPUs are not overwritten or preempted.

5. Whether overwriting the CPUs is required is determined according to a control channel resource used by the DCI for scheduling the first type CSI report.

6. Whether overwriting the CPUs is required is determined according to a search space used by the DCI for scheduling the first type CSI report; that is, whether overwriting the CPUs is required may be determined according to a time domain period and/or a time domain position of the search space used by the DCI scheduling this CSI. For example, if a period is less than 14 OFDM symbols, or a time domain OFDM symbol offset is not an integer multiple of 14, or a time domain position is not within first three time domain symbols of the time slot, the W CPUs are preempted when this CSI is triggered; otherwise, the CPUs are not overwritten or preempted.

7. Whether overwriting the CPUs is required is determined according to a target block error rate of a CQI or a CQI table corresponding to the first type CSI report; that is, whether overwriting the CPUs is required may be determined according to the target BLER of the CQI table or the CQI table corresponding to this CSI. For example, if the target BLER of the CQI table used by this CSI is less than 10e-1, the W CPUs are preempted when this CSI is triggered; otherwise, the CPUs are not overwritten or preempted.

8. Whether overwriting the CPUs is required is determined according to a service type corresponding to the first type CSI report.

9. Whether overwriting the CPUs is required is determined according to serving cell information corresponding to the first type CSI report.

10. Whether overwriting the CPUs is required is determined according to BWP information corresponding to the first type CSI report.

In some embodiments, other CSI originally existing in the CPUs but is overwritten or interrupted by the above CSI may be processed in at least one of the following manners.

Manner 1: The terminal does not update the interrupted CSI, or the terminal does not transmit the interrupted CSI, or the terminal discards the interrupted CSI.

Manner 2: The above CSI that overwrites the CPUs is supposed to be first type CSI, and the interrupted CSI in the CPUs is second type CSI. The time used by the first type CSI from DCI for triggering this CSI to a last symbol of a physical channel (e.g., a PUSCH or a PUCCH) for reporting this CSI is YU (i.e., first time); for a piece of second type CSI, the time of this CSI from triggered DCI to a physical channel for reporting this CSI is Y (i.e., second time); and (as shown in FIG. 2) within a time slot on which the second type CSI is triggered, in a case where no CPU interruption occurs, a maximum value of multiple minimum time differences, required by the terminal, from DCI for triggering each CSI of M CSI reports, which are capable of being updated, to a last symbol of a physical channel for reporting the each CSI is ZM (i.e., third time). If Y is greater than or equal to ZM+YU, this second type CSI may be updated; otherwise, this second type CSI is not updated, or not transmitted. Alternatively, if Y is greater than or equal to ZM+YU+d, this second type CSI may be updated; otherwise, this second type CSI is not updated, or not transmitted, where d is a determined constant.

Manner 3: The above CSI that overwrites the CPUs is supposed to be first type CSI, and the interrupted CSI in the CPUs is second type CSI. The time used by the first type CSI from a last symbol of a CSI-IM and/or a CSI-RS used for calculating this CSI to a last symbol of a physical channel (e.g., a PUSCH or a PUCCH) for reporting this CSI is YU' (i.e., first time); for a piece of second type CSI, the time difference from a last symbol of a CSI-RS and/or a CSI-IM used for calculating this CSI to a physical channel for reporting this CSI is Y' (i.e., second time); and within a time slot on which the second type CSI is triggered, in a case where no CPU interruption occurs, a maximum value of multiple minimum time differences, required by the terminal, from a last symbol of a CSI-RS and/or a CSI-IM used for calculating each CSI of M CSI reports, which are capable of being updated, to a last symbol of a physical channel for reporting the each CSI is ZM' (i.e., third time). If Y' is greater than or equal to ZM'+YU', this second type CSI may be updated, otherwise, this second type CSI is not updated, or not transmitted. Alternatively, if Y' is greater than or equal to ZM'+YU'+d', this second type CSI may be updated; otherwise, this second type CSI is not updated, or not transmitted, where d' is a determined constant.

Manner 4: The above CSI that overwrites the CPUs is supposed to be first type CSI, and the interrupted CSI in the CPUs is second type CSI. The time used by the first type CSI from the DCI for triggering this CSI to a last symbol of a physical channel (e.g., a PUSCH or a PUCCH) for reporting this CSI is YU (i.e., first time); for a piece of second type CSI, the time difference from completion of reporting the above first type CSI to a physical channel for reporting this CSI is Y (i.e., second time); and at a moment when the CPUs are overwritten, in second type CSI originally existing in the CPUs, a maximum value of multiple minimum time differences, required by the terminal, from DCI for triggering each CSI of M CSI reports, which are capable of being updated, to a last symbol of a physical channel for reporting the each CSI is ZM (i.e., third time). If Y is greater than or equal to ZM+YU, this second type CSI may be updated; otherwise, this second type CSI is not updated, or is not transmitted. Alternatively, if Y is greater than or equal to ZM+YU+d, this second type CSI may be updated; otherwise, this second type CSI is not updated, or is not transmitted, where d is a determined constant.

Manner 5: The above CSI that overwrites the CPUs is supposed to be first type CSI, and the interrupted CSI in the CPUs is second type CSI. The time used by the first type CSI from a last symbol of a CSI-RS and/or a CSI-IM used for calculating this CSI to a last symbol of a physical channel (e.g., a PUSCH or a PUCCH) for reporting this CSI is YU' (i.e., first time); for a piece of second type CSI, the time difference from completion of reporting the above first type CSI to a physical channel for reporting this CSI is Y' (i.e., second time); and at a moment when the CPUs are overwritten, in second type CSI originally existing in the CPUs, a maximum value of multiple minimum time differences, required by the terminal, from a last symbol of a CSI-RS and/or a CSI-IM used for calculating each CSI of M CSI reports, which are capable of being updated, to a last symbol of a physical channel for reporting the each CSI is ZM' (i.e., third time). If Y' is greater than or equal to ZM'+YU', this second type CSI may be updated; otherwise, this second type CSI is not updated, or not transmitted. Alternatively, if Y' is greater than or equal to ZM'+YU'+d', this second type CSI may be updated; otherwise, this second type CSI is not updated, or not transmitted, where d' is a determined constant.

In some embodiments, a CSI-RS resource defined in the following manners is as an active CSI-RS resource.

For an aperiodic CSI-RS, the CSI-RS is an active CSI-RS resource from the triggered CSI to a last symbol of a physical channel for transmitting the corresponding CSI report.

For a semi-persistent CSI-RS, the CSI-RS is an active CSI-RS resource when activation signaling is applicable until deactivation signaling is applicable.

For a periodic CSI-RS, the CSI-RS is an active CSI-RS resource before a configuration of the CSI-RS is released.

In some embodiments, the above CSI that overwrites the CPUs is supposed to be first type CSI, and the interrupted CSI in the CPUs is second type CSI. The step in which the W CPUs are overwritten includes one or more of the following manners, where a number of CSI-RS resources associated with the first type CSI report is UR, a number of CSI-RS ports associated with the first type CSI report is UP, a number of active CSI-RS resources existing before the W CPUs are overwritten is NR, a number of active CSI-RS ports existing before the W CPUs are overwritten is NP, a maximum number of active CSI-RS resources supported by the terminal is AR, and a maximum number of active CSI-RS ports supported by the terminal is AP.

A first active resource is cleared, and/or, a first active port is cleared, where the first active resource is an active CSI-RS resource associated with the corresponding processed CSI before the W CPUs are overwritten, and the first active port is an active CSI-RS port associated with the corresponding processed CSI before the W CPUs are overwritten.

A number of current active CSI-RS resources is reset to UR, and/or, a number of current active CSI-RS ports is reset to UP, and CSI, which is associated with NR active CSI-RSs and/or NP active CSI-RS ports existing before the W CPUs are overwritten, is not updated, not transmitted or discarded.

Active CSI-RS resources and/or ports associated with B second type CSI reports are cleared in an order of CSI-RS reset priorities associated with CSI-RSs from low to high, where B is a minimum value satisfying at least one of the following conditions:

after the active CSI-RS resources associated with the B second type CSI reports are cleared, a sum of UR and a number of remaining active CSI-RS resources is less than or equal to AR; or after the active CSI-RS ports associated with the B second type CSI reports are cleared, a sum of UP and a number of remaining active CSI-RS ports is less than or equal to AP.

The B second type CSI reports are not updated, not transmitted or discarded.

The CSI-RS reset priority includes at least one of: a CSI priority associated with a CSI-RS, the higher a CSI priority of a CSI-RS is, the higher the CSI-RS reset priority of the CSI-RS is; or according to whether CSI associated with a CSI-RS may be updated, the CSI-RS reset priority of the CSI that may be updated is high.

EMBODIMENT FOUR

This embodiment of the present disclosure provides a CSI feedback method. The method includes steps described below.

When a terminal is triggered to feed back a first type CSI report, the terminal is enabled to determine whether overwriting W CPUs is required according to a first type CSI report, and/or, according to signaling or a signaling format for triggering a first type CSI report; where W≤X, and X is the maximum number of CPUs used for processing CSI reports and supported by the terminal.

In some embodiment, the method may further include a step described below, a value of W is determined in one or more of the following manners: manner 1: the value of W is determined to be X; manner 2: the value of W is determined to be a preset value; manner 3: the value of W is determined according to higher layer configuration information of the first type CSI report; manner 4: the value of W is determined according to the first type CSI report; or manner 5: the value of W is determined according to a CSI reference signal resource associated with the first type CSI report.

In some embodiments, Q overwritten CSI reports satisfy at least one of that: after CPUs occupied by the Q overwritten CSI reports are overwritten, a sum of W and a number of CPUs unoccupied before the CPUs are overwritten is less than or equal to X; or, the Q overwritten CSI reports are Q CSI reports with low CSI reset priorities in CSI reports of the terminal before the W CPUs are overwritten.

The CSI reset priority may be determined in one or more of the following manners: manner 1: a CSI priority; manner 2: the higher a CSI priority is, the higher a CSI reset priority corresponding to the CSI priority is; or manner 3: a CSI reset priority corresponding to CSI is determined according to whether the CSI may be updated.

In some embodiments, the terminal is enabled to determine whether overwriting the W CPUs is required according to the first type CSI report, and/or, according to the signaling or the signaling format for triggering the first type CSI report in one or more of the following manners.

Manner 1: The terminal is indicated whether overwriting the CPUs is required through a configuration parameter of the first type CSI report; manner 2: the terminal is enabled to determine whether overwriting the CPUs is required through an RNTI used by DCI for triggering the first type CSI report; manner 3: the terminal is indicated whether overwriting the CPUs is required through a DCI parameter included in a DCI format for triggering the first type CSI report; manner 4: the terminal is enabled to determine whether overwriting the CPUs is required through a target error rate of an MCS or an MCS table used by the MCS indicated in DCI for scheduling the first type CSI report; manner 5: the terminal is enabled to determine whether overwriting the CPUs is required through a control channel resource used by the DCI for scheduling the first type CSI report; manner 6: the terminal is enabled to determine whether overwriting the CPUs is required through a search space used by the DCI for scheduling the first type CSI report; manner 7: the terminal is enabled to determine whether overwriting the CPUs is required through a target block error rate of a CQI or a CQI table corresponding to the first type CSI report; manner 8: whether overwriting the CPUs is required is determined through a service type corresponding to the first type CSI report; manner 9: whether overwriting the CPUs is required is determined through serving cell information corresponding to the first type CSI report; manner 10: whether overwriting the CPUs is required through BWP information corresponding to the first type CSI report.

In some embodiment, when the terminal is triggered to feed back the first type CSI report, the terminal is enabled to determine whether overwriting W CPUs is required according to the first type CSI report or according to the signaling or the signaling format for triggering the first type CSI report in one or more of the following manners: not updating, not receiving or discarding a second type CSI report; and/or, determining whether to update the second type CSI report according to first time, second time and third time.

The second type CSI report is a corresponding processed CSI report before the W CPUs are overwritten by the first type CSI report.

The first time is determined in at least one of the following manners.

The first time is time from DCI for triggering the first type CSI report to a last symbol of a physical channel for reporting the first type CSI report.

The first time is time from a last symbol of a CSI-IM resource and/or a CSI-RS used for calculating the first type CSI report to the last symbol of the physical channel for reporting the first type CSI report.

The second time is determined in at least one of the following manners.

The second time is time from DCI for triggering the second type CSI report to a physical channel for reporting the second type CSI report.

The second time is time from a last symbol of a CSI-RS and/or a CSI-IM used for calculating the second type CSI report to the physical channel for reporting the second type CSI report.

The second time is time from completion of reporting the above first type CSI to the physical channel for reporting the second type CSI report.

The second time is a smaller value selected from: the time from the last symbol of the CSI-RS and/or the CSI-IM used for calculating the second type CSI report to the physical channel for reporting the second type CSI report and the time from the completion of reporting the above first type CSI to the physical channel for reporting the second type CSI report.

The third time is determined in at least one of the following manners.

The third time is, in CSI reports triggered on a time slot in which the second type CSI report is triggered, a maximum value of multiple pieces of minimum time, required by the terminal, from DCI for triggering each of the CSI reports to a last symbol of a physical channel for reporting the each of the CSI reports.

The third time is minimum time, required by the terminal, from the DCI for triggering the second type CSI report to the last symbol of the physical channel for reporting the second type CSI report.

The third time is, in CSI reports triggered on a time slot in which the second type CSI report is triggered, a maximum value of multiple pieces of minimum time, required by the terminal, from a last symbol of a CSI-RS and/or a CSI-IM used for calculating each of the CSI reports to a last symbol of a physical channel for reporting the each of the CSI reports.

The third time is minimum time, required by the terminal, from the last symbol of the CSI-RS and/or the CSI-IM used for calculating the second type CSI report to the last symbol of the physical channel for reporting the second type CSI report.

For example, the first time, the second time and the third time are determined in at least one of the following combinations.

Manner 1: The first time is the time from the DCI for triggering the first type CSI report to the last symbol of the physical channel for reporting the first type CSI report; the second time is time for from the DCI triggering the second type CSI report to the physical channel for reporting the second type CSI report; and the third time is, among CSI reports triggered on a time slot in which the second type CSI report is triggered, a maximum value of multiple minimum time differences, required by the terminal, from DCI for triggering each of the CSI reports to a last symbol of a physical channel for reporting the each of the CSI reports, or the third time is a minimum time difference, required by the terminal, from the DCI for triggering the second type CSI report to the last symbol of the physical channel for reporting the second type CSI report.

Manner 2: The first time is the time from the last symbol of the CSI-RS and/or the CSI-IM used for calculating the first type CSI report to the last symbol of the physical channel for reporting the first type CSI report; the second time is the time from the last symbol of the CSI-RS and/or the CSI-IM used for calculating the second type CSI report to the physical channel for reporting the second type CSI report; and the third time is, among CSI reports triggered on the time slot in which the second type CSI report is triggered, a maximum value of multiple minimum time differences, required by the terminal, from a last symbol of a CSI-RS and/or CSI-IM used for calculating each of the CSI reports to a last symbol of a physical channel for reporting the each of the CSI reports, or the third time is a minimum time difference required by the terminal from the last symbol of the CSI-RS and/or the CSI-IM used for calculating the second type CSI report to a last symbol of the physical channel for reporting the second type CSI report.

Manner 3: The first time is the time from the DCI for triggering the first type CSI report to the last symbol of the physical channel for reporting the first type CSI report; the second time is the time from the completion of reporting the above first type CSI to the physical channel for reporting the second type CSI report; and the third time is, among CSI reports triggered on a time slot in which the second type CSI report is triggered, a maximum value of multiple minimum time differences, required by the terminal, from DCI for triggering each of the CSI reports to a last symbol of a physical channel for reporting the each of the CSI reports, or the third time is a minimum time difference, required by the terminal, from the DCI for triggering the second type CSI report to the last symbol of the physical channel for reporting the second type CSI report.

Manner 4: The first time is the time from the last symbol of the CSI-RS and/or the CSI-IM resource used for calculating the first type CSI report to the last symbol of the physical channel for reporting the first type CSI report; the second time is the time from the completion of reporting the above first type CSI to the physical channel for reporting the second type CSI report, or the second time is a smaller value selected from: the time from the last symbol of the CSI-RS and/or the CSI-IM used for calculating the second type CSI report to the physical channel for reporting the second type CSI report and the time difference from the completion of reporting the above first type CSI to the physical channel for reporting the second type CSI report; the third time is, among CSI reports triggered on the time slot in which the second type CSI report is triggered, a maximum value of multiple minimum time differences, required by the terminal, from a last symbol of a CSI-RS and/or a CSI-IM used for calculating each of the CSI reports to a last symbol of a physical channel for reporting the each of the CSI reports, or the third time is a minimum time difference, required by the terminal, from the last symbol of the CSI-RS and/or the CSI-IM used for calculating the second type CSI report to the last symbol of the physical channel for reporting the second type CSI report.

The step of determining whether to update the second type CSI report according to the first time, the second time and the third time may also include that: if the second time is greater than or equal to a sum of the first time and the third time, or is greater than or equal to a sum of the first time, the third time and a predetermined constant, the second type CSI report is updated; otherwise, the second type CSI report is not updated, not transmitted or discarded.

In some embodiments, when the terminal is triggered to feed back the first type CSI report, the terminal is enabled to determine whether overwriting the W CPUs is required according to the first type CSI report, or according to the signaling or the signaling format for triggering the first type CSI report in one or more of the following manners, where a number of CSI-RS resources associated with the first type CSI report is UR, a number of CSI-RS ports associated with the first type CSI report is UP, a number of active CSI-RS resources existing before the W CPUs are overwritten is NR, a number of active CSI-RS ports existing before the W CPUs are overwritten is NP, a maximum number of active CSI-RS resources supported by the terminal is AR, and a maximum number of active CSI-RS ports supported by the terminal is AP.

A first active resource is cleared, and/or, a first active port is cleared, where the first active resource is an active CSI-RS resource associated with the corresponding processed CSI before the W CPUs are overwritten, and the first active port is an active CSI-RS port associated with the corresponding processed CSI before the W CPUs are overwritten.

A number of current active CSI-RS resources is reset to UR, and/or, a number of current active CSI-RS ports is reset to UP, and CSI, which is associated with NR active CSI-RSs and/or NP active CSI-RS ports existing before the W CPUs are overwritten, is not updated, not received or discarded.

Active CSI-RS resources and/or ports associated with B second type CSI reports are cleared in an order of CSI-RS reset priorities associated with CSI-RSs from low to high, where B is a minimum value satisfying at least one of the following conditions:

after the active CSI-RS resources associated with the B second type CSI reports are cleared, a sum of UR and a number of remaining active CSI-RS resources is less than or equal to AR; or after the active CSI-RS ports associated with the B second type CSI reports are cleared, the sum of UP and a number of remaining active CSI-RS ports is less than or equal to AP.

The B second type CSI reports are not updated, not received or discarded.

The CSI-RS reset priority may be determined in one or more of the following manners.

The CSI-RS reset priority is a CSI priority associated with the CSI-RS.

The higher a CSI priority associated with a CSI-RS is, the higher a CSI-RS reset priority corresponding to the CSI-RS is.

A CSI-RS reset priority corresponding to a CSI-RS is determined according to whether CSI associated with the CSI-RS may be updated.

When this embodiment of the present disclosure is implemented, reference may be made to the embodiments described above, and this embodiment has the corresponding technical effects.

EMBODIMENT FIVE

Figure 5:
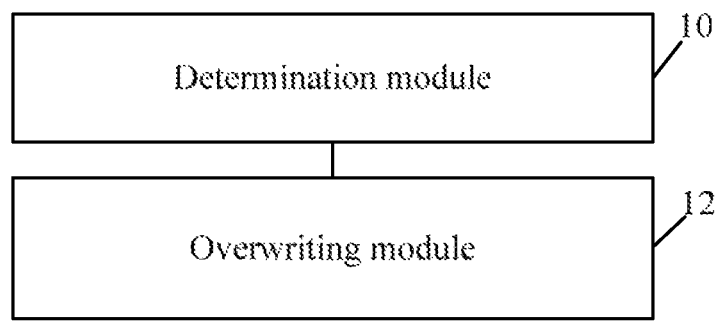
FIG. 5 is a structural diagram of a CSI feedback apparatus according to an embodiment of the present disclosure.

This embodiment of the present disclosure provides a CSI feedback apparatus. As shown in FIG. 5, the apparatus includes: a determination module 10, which is configured to determine whether overwriting CPUs is required according to a triggered first type CSI report, and/or, according to signaling or a signaling format for triggering the first type CSI report; and an overwriting module 12, which is configured to, in response to determining that overwriting is required, overwrite W CPUs, where W≤X, and X is the maximum number of CPUs used for processing CSI reports and supported by a terminal.

In some embodiments, the apparatus further includes a valuing module, which is configured to determine a value of W in one or more of the following manners.

The value of W is determined to be X.

The value of W is determined to be a preset value.

The value of W is determined according to higher layer configuration information of the first type CSI report.

The value of W is determined according to the first type CSI report.

The value of W is determined according to a CSI-RS resource associated with the first type CSI report.

In some embodiments, Q overwritten CSI reports satisfy at least one of:

After CPUs occupied by the Q overwritten CSI reports are overwritten, a sum of W and a number of CPUs unoccupied before the CPUs are overwritten is less than or equal to X.

The Q overwritten CSI reports are Q CSI reports with low CSI reset priorities in CSI reports of the terminal before the W CPUs are overwritten.

In some embodiments, the apparatus further includes a priority determination module, which is configured to determine a CSI reset priority in one or more of the following manners.

The CSI reset priority is a CSI priority.

The higher a CSI priority is, the higher a CSI reset priority corresponding to the CSI priority is.

The CSI reset priority corresponding to CSI is determined according to whether the CSI may be updated.

In some embodiments, the determination module is configured to determine whether overwriting CPUs is required according to the triggered first type CSI report, and/or, according to the signaling or the signaling format for triggering the first type CSI report in one or more of the following manners.

Whether overwriting the CPUs is required is determined according to a configuration parameter of the first type CSI report.

Whether overwriting the CPUs is required is determined according to an RNTI used by DCI for triggering the first type CSI report.

Whether overwriting the CPUs is required is determined according to a DCI parameter included in the DCI format for triggering the first type CSI report.

Whether overwriting the CPUs is required is determined according to a target block error rate of an MCS or an MCS table used by the MCS indicated in the DCI for scheduling the first type CSI report.

Whether overwriting the CPUs is required is determined according to a control channel resource used by the DCI for scheduling the first type CSI report.

Whether overwriting the CPUs is required is determined according to a search space used by the DCI for scheduling the first type CSI report.

Whether overwriting the CPUs is required is determined according to a target block error rate of a CQI or a CQI table corresponding to the first type CSI report.

Whether overwriting the CPUs is required is determined according to a service type corresponding to the first type CSI report.

Whether overwriting the CPUs is required is determined according to serving cell information corresponding to the first type CSI report.

Whether overwriting the CPUs is required is determined according to BWP information corresponding to the first type CSI report.

In some embodiments, the overwriting module is configured to not update, not transmit or discard a second type CSI report; and/or, determine whether to update the second type CSI report according to first time, second time and third time.

The second type CSI report is a corresponding processed CSI report before the W CPUs are overwritten by the first type CSI report.

The first time is determined in at least one of the following manners.

The first time is time from DCI for triggering the first type CSI report to a last symbol of a physical channel for reporting the first type CSI report.

The first time is time from a last symbol of a CSI-RS and/or a CSI-IM resource used for calculating the first type CSI report to the last symbol of the physical channel for reporting the first type CSI report.

The second time is determined in at least one of the following manners.

The second time is time from DCI for triggering the second type CSI report to a physical channel for reporting the second type CSI report.

The second time is time from a last symbol of a CSI-RS and/or a CSI-IM used for calculating the second type CSI report to the physical channel for reporting the second type CSI report.

The second time is time from completion of reporting the above first type CSI to the physical channel for reporting the second type CSI report.

The second time is a smaller value selected from: the time from the last symbol of the CSI-RS and/or the CSI-IM used for calculating the second type CSI report to the physical channel for reporting the second type CSI report and the time from the completion of reporting the above first type CSI to the physical channel for scheduling the second type CSI report.

The third time is determined in at least one of the following manners.

The third time is, in CSI reports triggered on a time slot in which the second type CSI report is triggered, a maximum value of multiple pieces of minimum time, required by the terminal, from DCI for triggering each of the CSI reports to a last symbol of a physical channel for reporting the each of the CSI reports.

The third time is minimum time, required by the terminal, from the DCI for triggering the second type CSI report to the last symbol of the physical channel for reporting the second type CSI report.

The third time is, in CSI reports triggered on a time slot in which the second type CSI report is triggered, a maximum value of multiple pieces of minimum time, required by the terminal, from a last symbol of a CSI-RS and/or a CSI-IM used for calculating each of the CSI reports to a last symbol of a physical channel for reporting the each of the CSI reports.

The third time is minimum time, required by the terminal, from the last symbol of the CSI-RS and/or the CSI-IM for calculating the second type CSI report to the last symbol of the physical channel for reporting the second type CSI report.

For example, the first time, the second time and the third time are determined in at least one of the following combinations.

The first time is the time from the DCI for triggering the first type CSI report to the last symbol of the physical channel for reporting the first type CSI report; the second time is a time difference from the DCI for triggering the second type CSI report to the physical channel for reporting the second type CSI report; and the third time is, among CSI reports triggered on a time slot in which the second type CSI report is triggered, a maximum value of multiple minimum time differences, required by the terminal, from DCI for triggering each of the CSI reports to a last symbol of a physical channel for reporting the each of the CSI reports, or the third time is a minimum time difference, required by the terminal, from the DCI for triggering the second type CSI report to the last symbol of the physical channel for reporting the second type CSI report.

The first time is the time from the last symbol of the CSI-RS and/or the CSI-IM resource used for calculating the first type CSI report to the last symbol of the physical channel for reporting the first type CSI report; the second time is a time difference from the last symbol of the CSI-RS and/or the CSI-IM used for calculating the second type CSI report to the physical channel for reporting the second type CSI report; and the third time is, among CSI reports triggered on the time slot in which the second type CSI report is triggered, a maximum value of multiple minimum time differences, required by the terminal, from a last symbol of a CSI-RS and/or a CSI-IM used for calculating each of the CSI reports to a last symbol of a physical channel for reporting the each of the CSI reports, or the third time is a minimum time difference required by the terminal from the last symbol of the CSI-RS and/or CSI-IM used for calculating the second type CSI report to the last symbol of the physical channel for reporting the second type CSI report.

The first time is the time from the DCI for triggering the first type CSI report to the last symbol of the physical channel for reporting the first type CSI report; the second time is a time difference from the completion of reporting the above first type CSI to the physical channel for reporting the second type CSI report; and the third time is, among CSI reports triggered on a time slot in which the second type CSI report is triggered, a maximum value of multiple minimum time differences, required by the terminal, from the DCI for triggering each of the CSI reports to a last symbol of a physical channel for reporting the each of the CSI reports, or the third time is a minimum time difference, required by the terminal, from the DCI for triggering the second type CSI report to the last symbol of the physical channel for reporting the second type CSI report.

The first time is the time from the last symbol of the CSI-RS and/or the CSI-IM resource used for calculating the first type CSI report to the last symbol of the physical channel for reporting the first type CSI report; the second time is a time difference from the completion of reporting the above first type CSI to the physical channel for reporting the second type CSI report, or the second time is a smaller value selected from: the time difference from the last symbol of the CSI-RS and/or the CSI-IM used for calculating the second type CSI report to the physical channel for reporting the second type CSI report and the time difference from the completion of reporting the above first type CSI to the physical channel for reporting the second type CSI report; and the third time is, among CSI reports triggered on the time slot in which the second type CSI report is triggered, a maximum value of multiple minimum time differences, required by the terminal, from a last symbol of a CSI-RS and/or a CSI-IM for calculating each of the CSI reports to a last symbol of a physical channel for reporting the each of the CSI reports, or the third time is the minimum time difference, required by the terminal, from the last symbol of the CSI-RS and/or the CSI-IM for calculating the second type CSI report to the last symbol of the physical channel for reporting the second type CSI report.

In some embodiments, the overwriting module is further configured to, if the second time is greater than or equal to a sum of the first time and the third time, or the second time is greater than or equal to a sum of the first time, the third time and a predetermined constant, update the second type CSI report; otherwise, not update, not transmit, or discard the second type CSI report.

In some embodiments, the overwriting module is configured to overwrite the W CPUs in one or more of the following manners, where a number of CSI-RS resources associated with the first type CSI report is UR, a number of CSI-RS ports associated with the first type CSI report is UP, a number of active CSI-RS resources existing before the W CPUs are overwritten is NR, a number of active CSI-RS ports existing before the W CPUs are overwritten is NP, a maximum number of active CSI-RS resources supported by the terminal is AR, and a maximum number of active CSI-RS ports supported by the terminal is AP.

A first active resource is cleared, and/or, a first active port is cleared, where the first active resource is an active CSI-RS resource associated with the corresponding processed CSI before the W CPUs are overwritten, and the first active port is an active CSI-RS port associated with the corresponding processed CSI before the W CPUs are overwritten.

A number of current active CSI-RS resources is reset to UR, and/or, a number of current active CSI-RS ports is reset to UP, and CSI, which is associated with NR active CSI-RSs and/or NP active CSI-RS ports existing before the W CPUs are overwritten, is not updated, not transmitted or discarded.

Active CSI-RS resources and/or ports associated with B second type CSI reports are cleared in an order of CSI-RS reset priorities associated with CSI-RSs from low to high, where B is a minimum value satisfying at least one of the following conditions:

after the active CSI-RS resources associated with the B second type CSI reports are cleared, a sum of UR and a number of remaining active CSI-RS resources is less than or equal to AR; or after the active CSI-RS ports associated with the B second type CSI reports are cleared, a sum of UP and a number of remaining active CSI-RS ports is less than or equal to AP.

The B second type CSI reports are not updated, not transmitted or discarded.

In some embodiments, the overwriting module is further configured to determine a CSI-RS reset priority in one or more of the following manners.

The CSI-RS reset priority is a CSI priority associated with the CSI-RS.

The higher a CSI priority associated with the CSI-RS is, the higher a CSI-RS reset priority corresponding to the CSI priority The CSI-RS reset priority corresponding to a CSI-RS is determined according to whether CSI associated with the CSI-RS is may be updated.

This embodiment of the present disclosure is an apparatus embodiment corresponding to the method of embodiments one to three. When this embodiment is implemented, reference may be made to the corresponding method embodiment, and this embodiment has the corresponding technical effects.

EMBODIMENT SIX

This embodiment of the present disclosure provides a CSI feedback apparatus. The apparatus includes a triggering unit, which is configured to, when a terminal is triggered to feed back a first type CSI report, enable the terminal to determine whether overwriting W CPUs is required according to the first type CSI report, and/or, according to signaling or a signaling format for triggering the first type CSI report; where W≤X, and X is a maximum number of CPUs used for processing CSI reports and supported by the terminal.

In some embodiments, the apparatus further includes a valuing unit, which is configured to determine a value of W in one or more of the following manners.

The value of W is determined to be X.

The value of W is determined to be a preset value.

The value of W is determined according to higher layer configuration information of the first type CSI report.

The value of W is determined according to the first type CSI report.

The value of W is determined according to a CSI-RS resource associated with the first type CSI report.

In some embodiments, Q overwritten CSI reports satisfy at least one of that: after CPUs occupied by the Q overwritten CSI reports are overwritten, a sum of W and a number of CPUs unoccupied before the CPUs are overwritten is less than or equal to X; or the Q overwritten CSI reports are Q CSI reports with low CSI reset priorities in CSI reports of the terminal before the W CPUs are overwritten.

In some embodiments, the apparatus further includes a priority determination unit, which is configured to determine a CSI reset priority in one or more of the following manners: a CSI priority is the CSI reset priority; the higher a CSI priority is, the higher a CSI reset priority corresponding to the CSI priority is; or a CSI reset priority corresponding to CSI is determined according to whether the CSI may be updated.

In some embodiments, the triggering unit is configured to enable the terminal to determine whether overwriting the W CPUs is required according to the first type CSI report, and/or, according to the signaling or the signaling format for triggering the first type CSI report in one or more of the following manners.

The terminal is indicated whether overwriting the CPUs is required through a configuration parameter of the first type CSI report.

The terminal is enabled to determine whether overwriting the CPUs is required through an RNTI used by DCI for triggering the first type CSI report.

The terminal is indicated whether overwriting the CPUs is required through a DCI parameter included in a DCI format for triggering the first type CSI report.

The terminal is enabled to determine whether overwriting the CPUs is required through or a target block error rate of an MCS or an MCS table used by the MCS indicated in the DCI for scheduling the first type CSI report.

The terminal is enabled to determine whether overwriting the CPUs is required according to a control channel resource used by the DCI for scheduling the first type CSI report.

The terminal is enabled to determine whether overwriting the CPUs is required according to a search space used by the DCI for scheduling the first type CSI report.

The terminal is enabled to determine whether overwriting the CPUs is required according to a target block error rate of a CQI or a CQI table corresponding to the first type CSI report.

Whether overwriting the CPUs is required is determined according to a service type corresponding to the first type CSI report.

Whether overwriting the CPUs is required is determined according to serving cell information corresponding to the first type CSI report.

Whether overwriting the CPUs is required is determined according to BWP information corresponding to the first type CSI report.

In some embodiments, the apparatus further includes a first updating unit.

The first updating unit is configured to not update, not receive or discard a second type CSI report; and/or, determine whether to update the second type CSI report according to first time, second time and third time.

The second type CSI report is a corresponding processed CSI report before the W of the CPUs are overwritten by the first type CSI report.

The first time is determined in at least one of the following manners.

The first time is time from DCI for triggering the first type CSI report to a last symbol of a physical channel for reporting the first type CSI report.

The first time is time from a last symbol of a CSI-IM resource and/or a CSI-RS used for calculating the first type CSI report to the last symbol of the physical channel for reporting the first type CSI report.

The second time is determined in at least one of the following manners.

The second time is time from DCI for triggering the second type CSI report to a physical channel for reporting the second type CSI report.

The second time is time from a last symbol of a CSI-RS and/or a CSI-IM used for calculating the second type CSI report to the physical channel for reporting the second type CSI report.

The second time is time from completion of reporting the above first type CSI to the physical channel for reporting the second type CSI report.

The second time is a smaller value selected from: the time from the last symbol of the CSI-RS and/or the CSI-IM used for calculating the second type CSI report to the physical channel for reporting the second type CSI report and the time from the completion of reporting the above first type CSI to the physical channel for reporting the second type CSI report.

The third time is determined in at least one of the following manners.

The third time is, in CSI reports triggered on a time slot in which the second type CSI report is triggered, a maximum value of multiple pieces of minimum time, required by the terminal, from DCI for triggering each of the CSI reports to a last symbol of a physical channel for reporting the each of the CSI reports.

The third time is minimum time, required by the terminal, from the DCI for triggering the second type CSI report to the last symbol of the physical channel for reporting the second type CSI report.

The third time is, in CSI reports triggered on a time slot in which the second type CSI report is triggered, a maximum value of multiple pieces of minimum time, required by the terminal, from a last symbol of a CSI-RS and/or a CSI-IM used for calculating each of the CSI reports to a last symbol of a physical channel for reporting the each of the CSI reports.

The third time is minimum time required by the terminal from the last symbol of the CSI-RS and/or the CSI-IM used for calculating the second type CSI report to the last symbol of the physical channel for reporting the second type CSI report.

For example, the first time, the second time and the third time are determined in at least one of the following combinations.

The first time is the time from the DCI for triggering the first type CSI report to the last symbol of the physical channel for reporting the first type CSI report; the second time is a time difference from the DCI for triggering the second type CSI report to the physical channel for reporting the second type CSI report; and the third time is, among CSI reports triggered on a time slot in which the second type CSI report is triggered, a maximum value of multiple minimum time differences, required by the terminal, from DCI for triggering each of the CSI reports to a last symbol of a physical channel for reporting the each of the CSI reports, or the third time is the minimum time difference required by the terminal from the DCI for triggering the second type CSI report to the last symbol of the physical channel for reporting the second type CSI report.

The first time is the time from the last symbol of the CSI-RS and/or the CSI-IM used for calculating the first type CSI report to the last symbol of the physical channel for reporting the first type CSI report; the second time is a time difference from the last symbol of the CSI-RS and/or the CSI-IM used for calculating the second type CSI report to the physical channel for reporting the second type CSI report; and the third time is, among CSI reports triggered on the time slot in which the second type CSI report is triggered, a maximum value of multiple minimum time differences, required by the terminal, from a last symbol of a CSI-RS and/or a CSI-IM used for calculating each of the CSI reports to a last symbol of a physical channel for reporting the each of the CSI reports, or the third time is a minimum time difference, required by the terminal, from the last symbol of the CSI-RS and/or the CSI-IM used for calculating the second type CSI report to the last symbol of the physical channel for reporting the second type CSI report.

The first time is the time from the DCI for triggering the first type CSI report to the last symbol of the physical channel for reporting the first type CSI report; the second time is a time difference from the completion of reporting the above first type CSI to the physical channel for reporting the second type CSI report; and the third time is, among CSI reports triggered on a time slot in which the second type CSI report is triggered, a maximum value of multiple minimum time differences, required by the terminal, from the DCI for triggering each of the CSI reports to a last symbol of a physical channel for reporting the each of the CSI reports, or the third time is a minimum time difference required by the terminal from the DCI for triggering the second type CSI report to the last symbol of the physical channel for reporting the second type CSI report.

The first time is the time from the last symbol of the CSI-RS and/or CSI-IM used for calculating the first type CSI report to the last symbol of the physical channel for reporting the first type CSI report; the second time is a time difference from the completion of reporting the above first type CSI to the physical channel for reporting the second type CSI report, or the second time is a smaller value selected from: the time difference from the last symbol of the CSI-RS and/or the CSI-IM used for calculating the second type CSI report to the physical channel for reporting the second type CSI report and the time difference from the completion of reporting the above first type CSI to the physical channel for reporting the second type CSI report; and the third time is, among CSI reports triggered on the time slot in which the second type CSI report is triggered, a maximum value of multiple minimum time differences, required by the terminal, from a last symbol of a CSI-RS and/or a CSI-IM used for calculating each of the CSI reports to a last symbol of a physical channel for reporting the each of the CSI reports, or the third time is a minimum time difference required by the terminal from the last symbol of the CSI-RS and/or the CSI-IM used for calculating the second type CSI report to the last symbol of the physical channel for reporting the second type CSI report.

In some embodiments, the first updating unit is further configured to, if the second time is greater than or equal to a sum of the first time and the third time, or, if the second time is greater than or equal to the sum of the first time, the third time and a predetermined constant, update the second type CSI report; otherwise, not update, not receive, or discard the second type CSI report.

In some embodiments, the apparatus further includes a second updating unit, which is configured to perform operations in one or more of the following manners, where a number of CSI-RS resources associated with the first type CSI report is UR, a number of CSI-RS ports associated with the first type CSI report is UP, a number of active CSI-RS resources existing before the W CPUs are overwritten is NR, a number of active CSI-RS ports existing before the W CPUs are overwritten is NP, a maximum number of active CSI-RS resources supported by the terminal is AR, and a maximum number of active CSI-RS ports supported by the terminal is AP.

A first active resource is cleared, and/or, a first active port is cleared, where the first active resource is an active CSI-RS active resource associated with the corresponding processed CSI before the W CPUs are overwritten, and the first active port is an active CSI-RS port associated with the corresponding processed CSI before the W CPUs are overwritten.

A number of current active CSI-RS resources is reset to UR, and/or, a number of current active CSI-RS ports is reset to UP, and CSI, which is associated with NR active CSI-RSs and/or NP active CSI-RS ports existing before the W CPUs are overwritten, is not updated, not received or discarded.

Active CSI-RS resources and/or ports associated with B second type CSI reports are cleared in an order of CSI-RS reset priorities associated with CSI-RSs from low to high, where B is a minimum value satisfying at least one of the following conditions:

after the active CSI-RS resources associated with the B second type CSI reports are cleared, a sum of UR and a number of remaining active CSI-RS resources is less than or equal to AR; or after the active CSI-RS ports associated with the B second type CSI reports are cleared, the sum of UP and a number of remaining active CSI-RS ports is less than or equal to AP.

The B second type CSI reports are not updated, not received, or discarded.

In some embodiments, the second updating unit is further configured to determine a CSI-RS reset priority in one or more of the following manners.

The CSI-RS reset priority is a CSI priority associated with the CSI-RS.

The higher a CSI priority is, the higher a CSI-RS reset priority corresponding to the CSI priority is.

A CSI-RS reset priority corresponding to a CSI-RS is determined according to whether CSI associated with the CSI-RS may be updated.

This embodiment of the present disclosure is an apparatus embodiment corresponding to the method of embodiment four. When this embodiment is implemented, reference may be made to the corresponding method embodiment, and this embodiment has the corresponding technical effects.

EMBODIMENT SEVEN

This embodiment of the present disclosure provides a terminal. The terminal includes a memory and a processor. The memory is configured to store a channel state information (CSI) feedback computer program, and the processor executes the computer program to implement steps of the method of any one of embodiments one to three.

EMBODIMENT EIGHT

This embodiment of the present disclosure provides a base station. The base station includes a memory and a processor. The memory is configured to store a channel state information (CSI) feedback computer program, and the processor executes the computer program to implement steps of the method of embodiment four.

EMBODIMENT NINE

This embodiment of the present disclosure provides a computer readable storage medium. The storage medium is configured to store a first CSI feedback computer program and/or a second CSI feedback computer program. The first CSI feedback computer program may be executed by at least one processor to implement the steps of the method of any one of Embodiments one to three, and the second CSI feedback computer program may be executed by at least one processor to implement the steps of the method of embodiment four.

When embodiments seven and eight are implemented, reference may be made to the method embodiments described above, and embodiments seven and eight have the corresponding technical effects.

It is to be noted that as used herein, the term "comprising", "including" or any other variant thereof is intended to encompass a non-exclusive inclusion so that a process, method, article or apparatus that includes a series of elements not only includes these elements but also includes other elements that are not expressly listed or are inherent to such a process, method, article or apparatus. In the absence of more restrictions, the elements defined by the statement "including a . . . " do not exclude the presence of additional identical elements in the process, method, article or apparatus that includes the elements.

The serial number of the above embodiments of the present disclosure is for description only and not for the superiority or inferiority of the embodiments.

From the description of the preceding embodiments, it will be apparent to those skilled in the art that the method in the preceding embodiments may be implemented by software plus a necessary general-purpose hardware platform or may of course be implemented by hardware. However, in many cases, the former is a preferred implementation. Based on this understanding, the solution of the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal (which may be a mobile phone, a computer, a server, an air-conditioner or a network device) to execute the method according to each embodiment of the present disclosure.

Embodiments of the present application are described above in conjunction with the drawings, but the present application is not limited to the preceding implementations. The preceding implementations are merely illustrative and not limiting. In light of the present application, without departing from the spirit of the present disclosure and the scope of the claims, a person of ordinary skill in the art can make many forms, all of which fall within the scope of the present application.

What is claimed is:

1. A channel state information (CSI) feedback method, comprising:
   determining whether overwriting CSI processing units (CPUs) is required according to at least one of: a triggered first type CSI report, or, signaling or a signaling format for triggering a first type CSI report; and
   in response to determining that overwriting the CPUs is required, overwriting W CPUs, wherein W≤X, and X is a maximum number of CPUs used for processing CSI reports and supported by a terminal.

2. The method of claim 1, further comprising: determining a value of W in at least one of the following manners:
   determining the value of W to be X;
   determining the value of W to be a preset value;
   determining the value of W according to higher layer configuration information of the first type CSI report;
   determining the value of W according to the first type CSI report; or
   determining the value of W according to a CSI reference signal resource associated with the first type CSI report.

3. The method of claim 1, wherein Q overwritten CSI reports corresponding to the W CPUs satisfy at least one of:
   after CPUs occupied by the Q overwritten CSI reports are overwritten, a sum of W and a number of unoccupied CPUs before the CPUs are overwritten is less than or equal to X; or
   the Q overwritten CSI reports are Q CSI reports with low CSI reset priorities before the W CPUs are overwritten.

4. The method of claim 3, further comprising: determining a CSI reset priority in at least one of the following manners:
   a CSI priority;
   the higher a CSI priority is, the higher a CSI reset priority corresponding to the CSI priority is; or
   determining a CSI reset priority corresponding to CSI according to whether the CSI is capable of being updated.

5. The method of claim 1, wherein determining whether overwriting the CPUs is required according to at least one of: the triggered first type CSI report, or, the signaling or the signaling format for triggering the first type CSI report comprises: determining whether overwriting the CPUs is required in at least one of the following manners:
   determining whether overwriting the CPUs is required according to a configuration parameter of the first type CSI report;

determining whether overwriting the CPUs is required according to a radio network temporary identity used by downlink control information (DCI) for triggering the first type CSI report;

determining whether overwriting the CPUs is required according to a DCI parameter contained in a DCI format for triggering the first type CSI report;

determining whether overwriting the CPUs is required according to a target block error rate of a modulation and coding scheme (MCS) or an MCS table used by the MCS indicated in DCI for scheduling the first type CSI report;

determining whether overwriting the CPUs is required according to a control channel resource used by DCI for scheduling the first type CSI report;

determining whether overwriting the CPUs is required according to a search space used by DCI for scheduling the first type CSI report;

determining whether overwriting the CPUs is required according to a target block error rate of a channel quality indicator (CQI) or a CQI table corresponding to the first type CSI report;

determining whether overwriting the CPUs is required according to a service type corresponding to the first type CSI report;

determining whether overwriting the CPUs is required according to serving cell information corresponding to the first type CSI report; or determining whether overwriting the CPUs is required according to bandwidth part (BWP) information corresponding to the first type CSI report.

6. The method of claim 1, wherein overwriting the W CPUs comprises at least one of:
not updating, not transmitting or discarding a second type CSI report; or
determining whether to update a second type CSI report according to first time, second time and third time;
wherein the second type CSI report is a corresponding processed CSI report before the W CPUs are overwritten by the first type CSI report;
wherein the first time is determined in at least one of the following manners that:
the first time is time from DCI for triggering the first type CSI report to a last symbol of a physical channel for reporting the first type CSI report; or the first time is time from a last symbol of at least one of a CSI interference measurement (CSI-IM) resource or a CSI reference signal (CSI-RS) used for calculating the first type CSI report to a last symbol of a physical channel for reporting the first type CSI report;
wherein the second time is determined in at least one of the following manners that:
the second time is time from DCI for triggering the second type CSI report to a physical channel for reporting the second type CSI report;
the second time is time from a last symbol of at least one of a CSI-IM or a CSI-RS used for calculating the second type CSI report to a physical channel for reporting the second type CSI report;
the second time is time from completion of reporting the first type CSI report to a physical channel for reporting the second type CSI report; or
the second time is a smaller value selected from: time from a last symbol of at least one of a CSI-IM or a CSI-RS used for calculating the second type CSI report to a physical channel scheduled for reporting the second type CSI report and time from completion of reporting the first type CSI to a physical channel for reporting the second type CSI report; and wherein the third time is determined in at least one of the following manners that:
the third time is a maximum value in a plurality of pieces of minimum time corresponding to a plurality of CSI reports triggered on a time slot in which the second type CSI report is triggered, wherein a piece of minimum time corresponding to each CSI report of the plurality of CSI reports is minimum time, required by the terminal, from DCI for triggering the each CSI report to a last symbol of a physical channel for reporting the each CSI report;
the third time is minimum time, required by the terminal, from DCI for triggering the second type CSI report to a last symbol of a physical channel for reporting the second type CSI report;
the third time is a maximum value in a plurality of pieces of minimum time corresponding to a plurality of CSI reports triggered on a time slot in which the second type CSI report is triggered, wherein a piece of minimum time corresponding to each CSI report of the plurality of CSI reports is minimum time, required by the terminal, from a last symbol of at least one of a CSI-IM or a CSI-RS for calculating the each CSI report to a last symbol of a physical channel for reporting the each CSI report; or
the third time is minimum time, required by the terminal, from a last symbol of at least one of a CSI-IM or a CSI-RS for calculating the second type CSI report to a last symbol of a physical channel for reporting the second type CSI report.

7. The method of claim 6, wherein determining whether to update the second type CSI report according to the first time, the second time and the third time comprises:
in a case where the second time is greater than or equal to a sum of the first time and the third time or is greater than or equal to a sum of the first time, the third time and a predetermined constant, updating the second type CSI report; and
in a case where the second time is less than the sum of the first time and the third time or is less than the sum of the first time, the third time and the predetermined constant, performing at least one of not updating, not transmitting or discarding the second type CSI report.

8. The method of claim 1, wherein a number of CSI-RS resources associated with the first type CSI report is UR, a number of CSI-RS ports associated with the first type CSI report is UP, a number of active CSI-RS resources existing before the W CPUs are overwritten is NR, a number of active CSI-RS ports existing before the W CPUs are overwritten is NP, a maximum number of active CSI-RS resources supported by the terminal is AR, and a maximum number of active CSI-RS ports supported by the terminal is AP;
wherein overwriting the W CPUs comprises at least one of:
clearing at least one of a first active resource or a first active port; wherein the first active resource is an active CSI-RS resource associated with corresponding processed CSI before the W CPUs are overwritten, and the first active port is an active CSI-RS port associated with the corresponding processed CSI before the W CPUs are overwritten;
performing at least one of: resetting a number of current active CSI-RS resources to UR, or resetting a number of current active CSI-RS ports to UP; wherein CSI, which is associated with at least one of the NP active CSI-RS ports or the NR active CSI-RS resources existing before the W CPUs are overwritten, is not updated, not transmitted or discarded;

clearing at least one of active CSI-RS ports or active CSI-RS resources associated with B second type CSI reports in an order of CSI-RS reset priorities associated with CSI-RS resources from low to high; wherein B is a minimum value satisfying at least one of the following conditions:

after the active CSI-RS resources associated with the B second type CSI reports are cleared, a sum of UR and a number of remaining active CSI-RS resources is less than or equal to AR; or after the active CSI-RS ports associated with the B second type CSI reports are cleared, a sum of UP and a number of remaining active CSI-RS ports is less than or equal to AP; or performing at least one of: not updating, not transmitting, or discarding the B second type CSI reports.

9. The method of claim 8, further comprising: determining a CSI-RS reset priority in at least one of the following manners:

a CSI priority associated with a CSI-RS;

the higher a CSI priority associated with a CSI-RS is, the higher a CSI-RS reset priority corresponding to the CSI-RS is; or determining a CSI-RS reset priority corresponding to a CSI-RS according to whether CSI associated with the CSI-RS is capable of being updated.

10. A channel state information (CSI) feedback method, comprising:

in response to a terminal being triggered to feed back a first type CSI report, enabling the terminal to determine whether overwriting W CSI processing units (CPUs) is required through at least one of: the first type CSI report, or, signaling or a signaling format for triggering the first type CSI report, and to overwrite the W CPUs in response to determining that overwriting the W CPUs is required; wherein W≤X, and X is a maximum number of CPUs used for processing CSI reports and supported by the terminal.

11. The method of claim 10, further comprising: determining a value of W in at least one of the following manners:

determining the value of W to be X;

determining the value of W to be a preset value;

determining the value of W according to higher layer configuration information of the first type CSI report;

determining the value of W according to the first type CSI report; or determining the value of W according to a CSI reference signal resource associated with the first type CSI report.

12. The method of claim 10, wherein Q overwritten CSI reports corresponding to the CPUs satisfy at least one of:

after CPUs occupied by the Q overwritten CSI reports are overwritten, a sum of W and a number of unoccupied CPUs before the CPUs are overwritten is less than or equal to X; or the Q overwritten CSI reports are Q CSI reports with low CSI reset priorities before the W CPUs are overwritten.

13. The method of claim 12, further comprising: determining a CSI reset priority in at least one of the following manners:

a CSI priority;

the higher a CSI priority is, the higher a CSI reset priority corresponding to the CSI priority is; or determining a CSI reset priority corresponding to CSI according to whether the CSI is capable of being updated.

14. The method of claim 10, wherein enabling the terminal to determine whether overwriting the W CPUs is required through at least one of: the first type CSI report, or, the signaling or the signaling format for triggering the first type CSI report comprises: enabling the terminal to determine whether overwriting the W CPUs is required in at least one of the following manners:

indicating the terminal whether overwriting the CPUs is required through a configuration parameter of the first type CSI report;

enabling the terminal to determine whether overwriting the CPUs is required through a radio network temporary identity used by downlink control information (DCI) for triggering the first type CSI report;

indicating the terminal whether overwriting the CPUs is required through a DCI parameter contained in a DCI format for triggering the first type CSI report;

enabling the terminal to determine whether overwriting the CPUs is required through a target block error rate of a modulation and coding scheme (MCS) or an MCS table used by the MCS indicated in DCI for scheduling the first type CSI report;

enabling the terminal to determine whether overwriting the CPUs is required through a control channel resource used by DCI for scheduling the first type CSI report;

enabling the terminal to determine whether overwriting the CPUs is required through a search space used by DCI for scheduling the first type CSI report;

enabling the terminal to determine whether overwriting the CPUs is required through a target block error rate of a channel quality indicator (CQI) or a CQI table corresponding to the first type CSI report;

determining whether overwriting the CPUs is required through a service type corresponding to the first type CSI report;

determining whether overwriting the CPUs is required through serving cell information corresponding to the first type CSI report; or determining whether overwriting the CPUs is required through bandwidth part (BWP) information corresponding to the first type CSI report.

15. The method of claim 10, further comprising at least one of:

not updating, not receiving or discarding a second type CSI report; or determining whether to update a second type CSI report according to first time, second time and third time;

wherein the second type CSI report is a corresponding processed CSI report before the W CPUs are overwritten by the first type CSI report;

wherein the first time is determined in at least one of the following manners that:

the first time is time from DCI for triggering the first type CSI report to a last symbol of a physical channel for reporting the first type CSI report; or the first time is time from a last symbol of at least one of a CSI interference measurement (CSI-IM) resource or a CSI reference signal (CSI-RS) used for calculating the first type CSI report to a last symbol of a physical channel for reporting the first type CSI report;

wherein the second time is determined in at least one of the following manners that:

the second time is time from DCI for triggering the second type CSI report to a physical channel for reporting the second type CSI report;

the second time is time from a last symbol of at least one of a CSI-IM or a CSI-RS used for calculating the second type CSI report to a physical channel for reporting the second type CSI report;

the second time is time from completion of reporting the first type CSI report to a physical channel for reporting the second type CSI report; or the second time is a smaller value selected from: time from a last symbol of at least one of a CSI-IM or a CSI-RS used for calculating the second type CSI report to a physical channel for reporting the second type CSI report, and time from completion of reporting the first type CSI to a physical channel scheduled for reporting the second type CSI report; and wherein the third time is determined in at least one of the following manners that:

the third time is a maximum value in a plurality of pieces of minimum time corresponding to a plurality of CSI reports triggered on a time slot in which the second type CSI report is triggered, wherein a piece of minimum time corresponding to each CSI report of the plurality of CSI reports is minimum time, required by the terminal, from DCI for triggering the each CSI report to a last symbol of a physical channel for reporting the each CSI report;

the third time is minimum time, required by the terminal, from DCI for triggering the second type CSI report to a last symbol of a physical channel for reporting the second type CSI report;

the third time is a maximum value in a plurality of pieces of minimum time corresponding to a plurality of CSI reports triggered on a time slot in which the second type CSI report is triggered, wherein a piece of minimum time corresponding to each CSI report of the plurality of CSI reports is minimum time, required by the terminal, from a last symbol of at least one of a CSI-IM or a CSI-RS for calculating the each CSI report to a last symbol of a physical channel for reporting the each CSI report; or the third time is minimum time, required by the terminal, from a last symbol of at least one of a CSI-IM or a CSI-RS for calculating the second type CSI report to a last symbol of a physical channel for reporting the second type CSI report.

16. The method of claim 15, wherein determining whether to update the second type CSI report according to the first time, the second time and the third time comprises:

in a case where the third time is greater than or equal to a sum of the first time and the second time or is greater than or equal to a sum of the first time, the second time and a predetermined constant, updating the second type CSI report; and in a case where the third time is less than the sum of the first time and the second time or is less than the sum of the first time, the second time and the predetermined constant, performing at least one of not updating, not receiving or discarding the second type CSI report.

17. The method of claim 10, wherein a number of CSI-RS resources associated with the first type CSI report is UR, a number of CSI-RS ports associated with the first type CSI report is UP, a number of active CSI-RS resources existing before the W CPUs are overwritten is NR, a number of active CSI-RS ports existing before the W CPUs are overwritten is NP, a maximum number of active CSI-RS resources supported by the terminal is AR, and a maximum number of active CSI-RS ports supported by the terminal is AP;

wherein the method further comprises:

clearing at least one of a first active resource or a first active port, wherein the first active resource is an active CSI-RS resource associated with corresponding processed CSI before the W CPUs are overwritten, and the first active port is an active CSI-RS port associated with the corresponding processed CSI before the W CPUs are overwritten;

resetting at least one of a number of current active CSI-RS resources to UR, or, a number of current active CSI-RS ports to UP, and performing at least one of not updating, not receiving or discarding CSI associated with at least one of the NP active CSI-RS ports or the NR active CSI-RS resources existing before the W CPUs are overwritten;

clearing at least one of active CSI-RS ports or active CSI-RS resources associated with B second type CSI reports in an order of CSI-RS reset priorities associated with CSI-RS resources from low to high; wherein B is a minimum value satisfying at least one of the following conditions:

after the active CSI-RS resources associated with the B second type CSI reports are cleared, a sum of UR and a number of remaining active CSI-RS resources is less than or equal to AR; or after the active CSI-RS ports associated with the B second type CSI reports are cleared, a sum of UP and a number of remaining active CSI-RS ports is less than or equal to AP; or performing at least one of: not updating, not receiving, or discarding the B second type CSI reports.

18. The method of claim 17, further comprising: determining a CSI-RS reset priority in at least one of the following manners:

a CSI priority associated with a CSI-RS;

the higher a CSI priority associated with a CSI-RS is, the higher a CSI-RS reset priority corresponding to the CSI-RS is; or determining a CSI-RS reset priority corresponding to a CSI-RS according to whether CSI associated with the CSI-RS is capable of being updated.

19. A base station, comprising a memory and a processor, wherein the memory is configured to store a channel state information (CSI) feedback computer program, and the processor executes the computer program to implement the method of claim 10.

20. A terminal, comprising a memory and a processor, wherein the memory is configured to store a channel state information (CSI) feedback computer program, and the processor executes the computer program to implement the following steps:

determining whether overwriting CSI processing units (CPUs) is required according to at least one of: a triggered first type CSI report, or, signaling or a signaling format for triggering a first type CSI report; and in response to determining that overwriting the CPUs is required, overwriting W CPUs, wherein W≥X, and X is a maximum number of CPUs used for processing CSI reports and supported by a terminal.

* * * * *